United States Patent
Kotani et al.

(10) Patent No.: US 12,311,264 B2
(45) Date of Patent: May 27, 2025

(54) PROGRAM, TERMINAL, GAME SYSTEM AND GAME MANAGEMENT SYSTEM

(71) Applicant: BANDAI CO., LTD., Tokyo (JP)

(72) Inventors: Hideto Kotani, Tokyo (JP); Masahiko Saito, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 16 days.

(21) Appl. No.: 17/909,814

(22) PCT Filed: Mar. 3, 2021

(86) PCT No.: PCT/JP2021/008287
§ 371 (c)(1),
(2) Date: Sep. 7, 2022

(87) PCT Pub. No.: WO2021/182258
PCT Pub. Date: Sep. 16, 2021

(65) Prior Publication Data
US 2024/0198228 A1    Jun. 20, 2024

(30) Foreign Application Priority Data

Mar. 9, 2020  (JP) .................... 2020-039587

(51) Int. Cl.
*A63F 13/46* (2014.01)
*A63F 13/5375* (2014.01)
(Continued)

(52) U.S. Cl.
CPC .......... *A63F 13/5375* (2014.09); *A63F 13/46* (2014.09); *A63F 13/69* (2014.09); *A63F 13/822* (2014.09); *A63F 13/533* (2014.09)

(58) Field of Classification Search
CPC ...... A63F 13/5375; A63F 13/46; A63F 13/69; A63F 13/822; A63F 13/533
See application file for complete search history.

(56) References Cited

U.S. PATENT DOCUMENTS 6,375,566 B1 * 4/2002 Yamada .................... A63F 1/00
463/43
2002/0142847 A1 * 10/2002 Thompson .............. A63F 13/10
463/43
(Continued)

FOREIGN PATENT DOCUMENTS

JP        2013-169220 A    9/2013
JP        2015-8985 A      1/2015
(Continued)

OTHER PUBLICATIONS

Japan Patent Office, Office Action for Japanese Patent Application No. 2021-208056, Feb. 7, 2024 (A machine translation is attached hereto).
(Continued)

*Primary Examiner* — Omkar A Deodhar
*Assistant Examiner* — Shauna-Kay Hall

(57) ABSTRACT

A program causes a computer to perform execution processing for performing a battle game in which a deck comprising a plurality of first game elements is used; and recommended deck presentation processing for presenting a recommended deck which is recommended for use in the battle game, under a condition that the number of predetermined losses of a player in the battle game reaches a predetermined number.

16 Claims, 21 Drawing Sheets

(51) Int. Cl.
*A63F 13/69* (2014.01)
*A63F 13/822* (2014.01)
*A63F 13/533* (2014.01)

(56) References Cited

U.S. PATENT DOCUMENTS

| | | | | |
|---|---|---|---|---|
| 2014/0066199 | A1* | 3/2014 | Takagi | A63F 13/53 463/31 |
| 2014/0295929 | A1* | 10/2014 | Otomo | G07F 17/323 463/11 |
| 2021/0069598 | A1* | 3/2021 | Nagura | A63F 13/795 |

FOREIGN PATENT DOCUMENTS

| | | | |
|---|---|---|---|
| JP | 2016-32545 | A | 3/2016 |
| JP | 5941605 | B1 | 6/2016 |
| JP | 6345867 | B1 | 6/2018 |
| JP | 2018-171181 | A | 11/2018 |
| JP | 2019-42170 | A | 3/2019 |
| JP | 6521550 | B1 | 5/2019 |

OTHER PUBLICATIONS

WIPO, International Search Report for International Application No. PCT/JP2021/008287, Apr. 27, 2021.
WIPO, Written Opinion for International Application No. PCT/JP2021/008287, Apr. 27, 2021.
Japan Patent Office, Office Action for Japanese Patent Application No. 2020-039587, Apr. 28, 2021 (A machine translation is attached hereto).
Japan Patent Office, Office Action for Japanese Patent Application No. 2021-208056, Nov. 15, 2023 (A machine translation is attached hereto).

* cited by examiner

| Card identification information | 001 |
|---|---|
| Character name | AAA |
| Card image | A1 |
| Ethnicon | BBB |
| Ability | Flame |
| Attach power | 100 |
| HP | 300 |
| Rarity | 2 |
| Cost information | 3 |
| Attribute (color) | Red |
| ⋮ | ⋮ |

FIG. 5

| | |
|---|---|
| User identification info (Player ID) | 1001 |
| Rank | xxx |
| Element | xxxxx |
| Buddy setting data | |
| Buddy identification info. | B001 |
| Character image | Data |
| Buddy Name | AAA |
| Buddy's empirical value | xxxxx |
| Level | 2 |
| Card comprehension level | 50 |
| Personality | Red |
| | Red accum. value: 4000 |
| | Blue accum. value: 3800 |
| | Yellow accum. value: 1000 |
| | Green accum. value: 1500 |
| | White accum. value: 2000 |
| | Violet accum. Value: 500 |
| Synchronization level | 20 |
| ⋮ | |
| Possessed card information | |
| Card identification info. | 001 |
| ⋮ | |
| Deck setting data | |
| Battle record | |
| ⋮ | |
| Balance information | |
| Currency A | 10000 |
| ⋮ | |

| Deck setting data | |
|---|---|
| Deck 1 | |
| Card ID info | 001 |
| ⋮ | |
| Deck 2 | |
| Card ID info | 001 |
| ⋮ | |

FIG. 6

| Recommended deck identification information | RD001 |
|---|---|
| Deck name | xxxxxxxxx |
| Deck structure (Card Identification info) | 06 |
| | ⋮ |
| | 023 |
| Recommended deck identification information | RD002 |
| Deck name | xxxxxxxxx |
| Deck structure (Card Identification info) | 101 |
| | ⋮ |
| | 158 |
| ⋮ | ⋮ |

FIG. 10

| Player A | |
| --- | --- |
| (User Identification information: 1001) | |
| ⋮ | |
| Battle data | |
| Battle ID | B0010 |
| Battle result | Win |
| Date of the battle | 2019/12/28 18:05:40 |
| Opponent | Player |
| Used deck information | xxx, xxx, xxx, xxx, xxx, xxx, ⋯ |
| Battle detail information | |
| Used card at Turn 1 | 101, 003, 102, 254 |
| Used card at Turn 2 | xxx, xxx, xxx, xxx xxx, ⋯ |
| Used card at Turn 3 | xxx, xxx, xxx, xxx xxx, ⋯ |
| ⋮ | ⋮ |
| ⋮ | |

FIG. 11

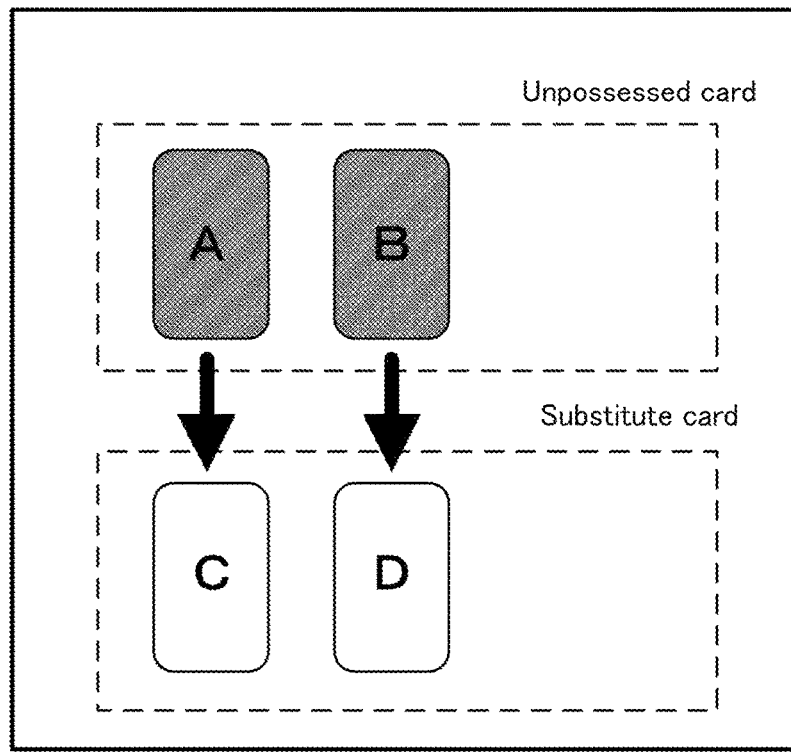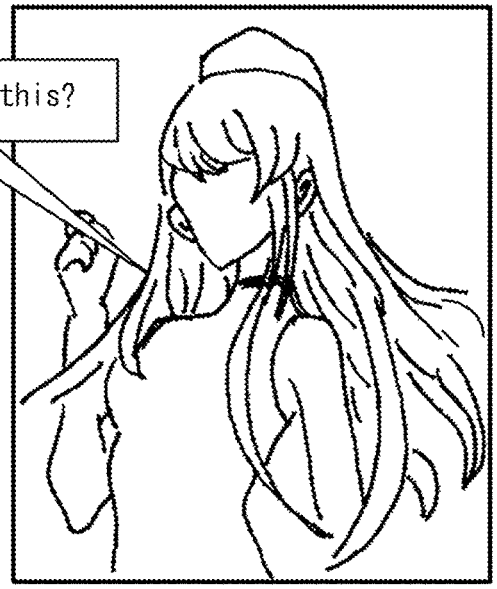
FIG. 17

PROGRAM, TERMINAL, GAME SYSTEM AND GAME MANAGEMENT SYSTEM

TECHNICAL FIELD

The present invention relates to a program, a terminal, a game system and a game management system.

BACKGROUND ART

In recent years, games using a smartphone, a mobile phone or the like as a platform, are popular. For example, in such a game, a win or loss of a battle game is determined by using a deck formed by combining game elements such as virtual cards etc. and by using parameters of each of the game elements, which form the deck.

Further, in a game in which a character corresponding to a player defeats enemy characters existing each area, an area recommended as an object to be selected is displayed (Patent Literature 1).

CITATION LIST

Patent Literature

Patent Literature 1: Japanese Patent Application Publication No. 2013-169220.

SUMMARY OF INVENTION

Technical Problem

In a game in which a deck is used, enjoyability of a player can be enhanced if it is possible to set a deck recommended for used in a battle.

It is an object of the present invention to provide a program, a terminal, a game system and game management apparatus capable of providing a game in which such enjoyability of the player is enhanced.

Solution to Problem

As one aspect of the present invention, a program causes a computer to perform execution processing for performing a battle game in which a deck composed of a plurality of first game elements is used, and recommended deck presentation processing for presenting a recommended deck which is recommended for use in the battle game under the condition that the number of predetermined losses of the player in the battle game reaches a predetermined number.

As another aspect of the present invention, a program manages a battle game, in which a deck composed of first game elements is used, wherein the program causes a computer to perform an acquiring process for acquiring a recommended deck which is recommended for use in the battle game under the condition that the number of predetermined losses of a player in the battle game reaches a predetermined number; and processing for outputting the recommended deck.

As a still another aspect of the present invention, a terminal includes a memory in which execution instructions are stored and a processer, wherein the processer performs, based on the execution instructions, execution processing for performing a battle game in which a deck composed of a plurality of first game elements is used; and recommended deck presentation processing for presenting a recommended deck which is recommended for use in the battle game under the condition that the number of predetermined losses in the battle game reaches a predetermined number.

As a yet another aspect of the present invention, a game system performs a battle game in which a deck composed of first game elements is used, wherein the game system includes an acquiring unit which acquires a recommended deck recommended for use in the battle game under the condition that the number of predetermined losses of a player in the battle game reaches a predetermined number; and a recommended deck presenting unit which presents the acquired recommended deck to the player.

As a further aspect of the present invention, a game management apparatus manages a battle game in which a deck composed of first game elements is used, wherein the game management apparatus comprising an acquiring unit which acquires a recommended deck which is recommended for use in the battle game under the condition that the number of predetermined losses of the player in the battle game reaches a predetermined number; and a unit for outputting the recommended deck.

Advantageous Effects of Invention

According to the present application, it is possible to provide a game which enhances enjoyability of a user.

BRIEF DESCRIPTION OF DRAWINGS

FIG. 5 shows an example of card setting data.

FIG. 6 shows an example of user information data.

FIG. 10 is a diagram illustrating an example of recommended deck data.

FIG. 11 is a diagram illustrating an example of a battle data.

FIG. 17 is a diagram illustrating an example of a presentation screen where a substitute card is suggested.

DESCRIPTION OF EMBODIMENTS

First Embodiment According to the Present Invention

[Overall Configuration]

Figure 1:
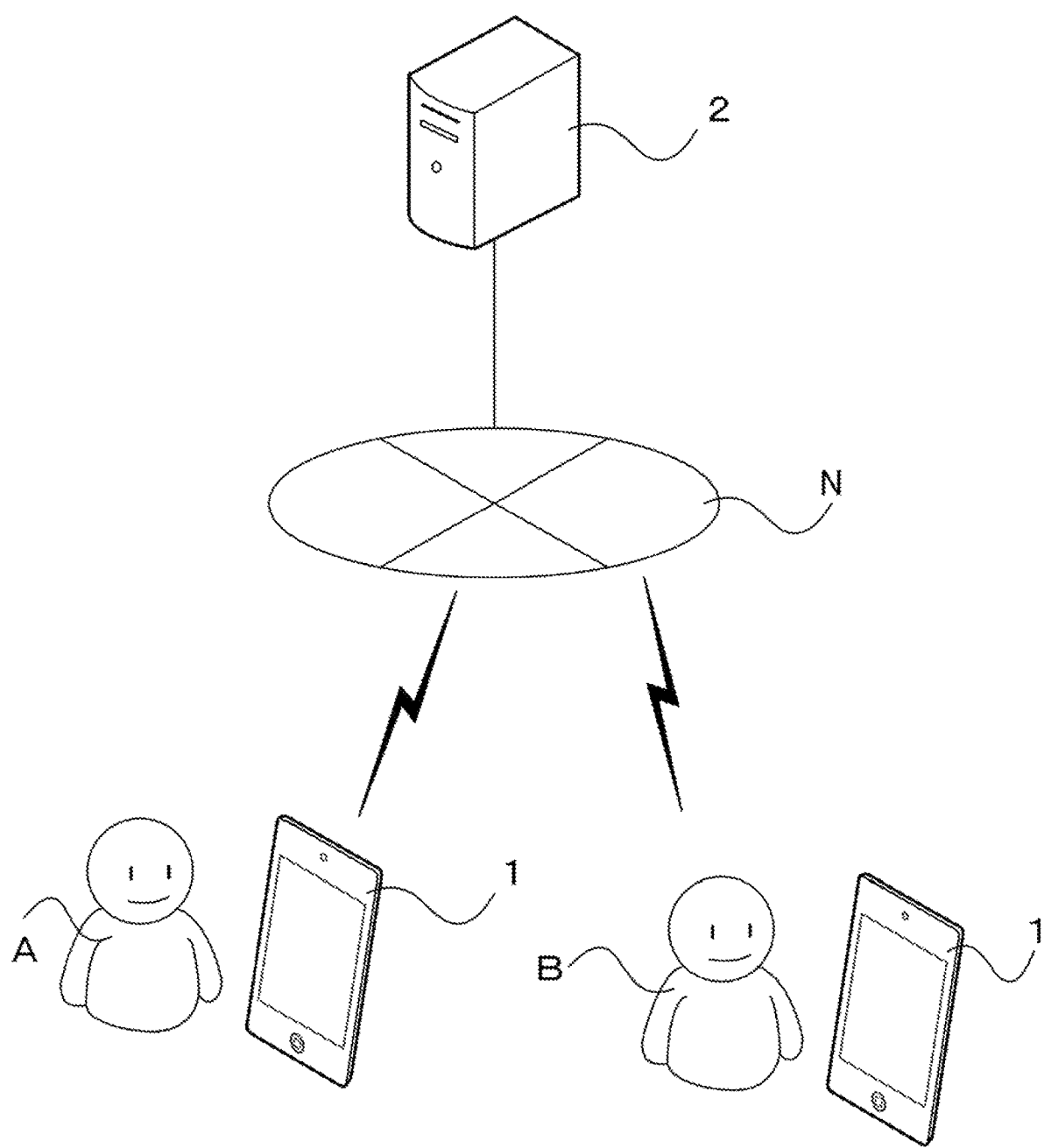
FIG. 1 is a diagram illustrating an example of the overall configuration of a game system according to the present embodiment.

FIG. 1 is a diagram illustrating an example of an overall configuration of a game system according to the present embodiment. As shown in FIG. 1, the game system comprises player terminals 1, which are respectively provided to game players A, B; and a game server 2. The player terminals and the game server 2 are capable of connecting to a communication line N and communicating with each other.

The communication line N represents a communication path capable of data communication. That is, the communication line N includes a communication network, such as a telephone communication network, a cable network, the internet, etc., in addition to a LAN established by a dedicated line (dedicated cable) for direct connection or an Ethernet (registered trademark) and the like. A communication method of the communication line N may be either wired or wireless.

The player terminal 1 is a computer capable of running a game program, and can be connected to the communication line N via a wireless communication base station or the like, and can perform data communication with the game server 2. The player terminal 1 may be a smartphone, a mobile phone, a portable game device, a stationary home game device, a business use game device, a personal computer, a tablet computer, and a controller for a stationary home game device or the like. Basically, there are multiple player terminals 1, which are operated by respective players.

The game server 2 is a server system configured by including one or more server devices and memory devices or the like. The game server 2 provides various services for running a game according to the present embodiment. The game server 2 can perform data management required to run the game, and deliver the game program and data required for performing the game at the player terminal 1 or the like.

Figure 2:
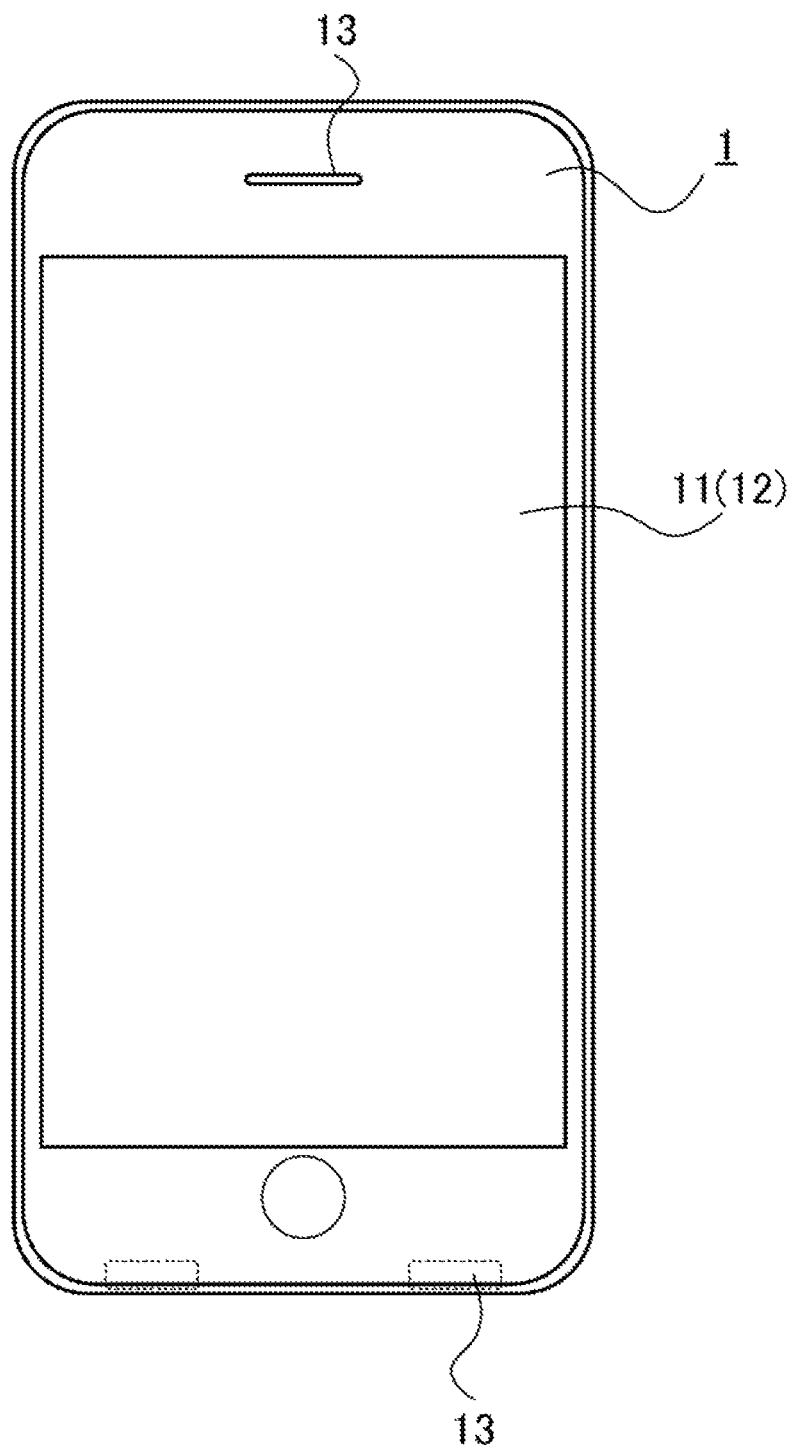
FIG. 2 is a diagram illustrating an example of the device configuration of a smartphone, which is an example of a player terminal 1.

FIG. 2 is a diagram illustrating the device configuration of a smartphone, which is an example of the player terminal 1. As shown in FIG. 2, the player terminal 1 includes a display 11, a touch operation panel 12 integral with the display 11, and a speaker 13. Although not illustrated, a control board, a built-in battery, a power button, and a volume control button and the like are provided in the player terminal 1.

On the control board, various microprocessor(s), such as a CPU, a GPU, a DSP, etc., various IC memories, such as an ASIC, a VRAM, a RAM, a ROM, a wireless communication module for wirelessly communicating with a mobile phone base station and the like are mounted. Further, on the control board, a so-called I/F circuit (interface circuit), such as a driver circuit for the touch operation panel 12, etc., is mounted. These elements mounted on the control board are electrically connected with one another via a bus circuit etc., and are connected so as to be able to read and write data, and transmit and receive signals.

Described blow is an example according to the present embodiment, wherein the above-described system is applied to a battle game that uses first game elements possessed by a first player A and first game elements possessed by a second player B, who is an opponent.

Here, each of these first game elements is a character represented by being embodied in an image, such as a still image, a video image, etc., or as a virtual or substantial article or the like. As one example of the virtual or substantial article, a virtual card displayed on a computer or a substantial card and the like is exemplified. Here, the article is not limited to such a card as long as it is an article, from which such a game element associated with the article can be identified. For example, the article may be a sculptural object, such as a figure having an appearance of a game element.

In the following description, it is premised that, in a game to be performed, such a first game element, which can appear when such a card is used, is a character whose action is controlled based on an operation of the player (including a non-player operated by a computer), and that a corresponding character design (an image exhibiting an exterior appearance of the character) is attached to the card. In addition, the card used to identify the game element in the game to be performed is not limited to such a card, from which the game element, such as the character, etc. can be identified, and such a card may, of course, be a card from which a game element, such as an item, an effect to be invoked etc. can be identified.

A deck is made up of a predetermined number of first game elements. The predetermined number of first game elements is set as a player's deck. For example, where the first game elements are respectively embodied as virtual cards displayed on a computer, the deck is composed of a group of the predetermined number of cards. In the present embodiment, the decks which can be set, include a normal deck and a recommended deck. The normal deck defined herein is organized by a normal deck organization function, in accordance with an operation of the player. On the other hand, the recommended deck defined herein is a deck which is recommended for use in the battle. The recommended decks include a deck, in which the configuration of the deck (cards included in the deck) is determined, based on a winning percentage, usage rate, degree of popularity, ease of use etc.

At least one of a plurality of attributes is associated with a first game element (card). Each of these attributes is specified by, for example, a color. In such case, one of a plurality of different colors (for example, red, white, yellow, blue, green, violet and the like) is associated with the first game element. In addition, kinds of the colors are not limited thereto and other colors may be used.

Further, a second game element different from the first game element is added to the battle game to which the present embodiment is applied. Although the second game element is a character similar to the first game element, the second game element need not be associated with a virtual or substantial article.

The second game element uses the first game elements the player possesses, in the game. Here, use of the first game element defined herein includes a selection of the first game element or a determination of an action thereof in the game. When the first game element is, for example, a character embodied as a card, the second game element autonomously or voluntarily (actively) determines selection from cards possessed by the player or an action thereof in a battle of the game. In other words, as in a function of a non-player operated by a computer, the second game element performs an operation, which is similar to selection of the first game element or determination of an action or the like, which is performed by the player. Here, although a conventional non-player is operated by the computer instead of a human player, the second game element exists separately and independently from the human player, and differs therefrom in that the second game element uses the first game elements. Further, unlike the conventional non-player, the player and the second game element form a group (a pair). The number of the second game elements is not limited to one, and it may be two or more. The player can select one or more of the second game elements from two or more kinds of second game elements, to form a group with the himself or herself. In case there are two or more second game elements, these second game elements are different from each other in an initial value of character information thereby affecting autonomous or voluntary (active) action etc. of the second game elements.

Each second game element has such character information. The character information affects the autonomous or voluntary (active) actions of the second game element (use of the first game element) etc. In other words, the character information is an ability of the second game element, so that the autonomous or voluntary (active) actions of the second game element differ in accordance with the differences in ability. The character information changes in accordance with progress of the game etc. The character information can have two or more parameters. For example, in the present embodiment, the character information includes parameters of a level, a card comprehension level, a synchronization level and personality).

The level represents a basic level of the second game element and increases in accordance with an empirical value gained by playing battles. And as the level increases, a thinking ability of the second game element can be increased. As the thinking ability is higher, it is possible to more appropriately use the first game elements depending on a situation of the game.

Here, the card comprehension level is a parameter which changes according to use status and use frequency of each kind of the first game elements in battles and the like, and represents a level of comprehension about the first game elements. As the card comprehension level is higher, it is possible to use the first game elements (cards) at more appropriate timing.

The synchronizing level increases as the game proceeds. The synchronizing level also increases when a predetermined event is achieved in a game. The predetermined event includes a login to the game, action together with the player in the battle, purchase of a card and acquisition of a specific card. As the synchronizing level is higher, the action thereof will more intimate. The synchronizing level may be described as a parameter indicating a relationship between the player and the second game element.

The personality is an attribute regarding a character of the second game element. One of two or more attributes (colors) is assigned to the personality. The personality is changed in accordance with a use frequency of the attribute (color) of the first game elements used in the battles.

The autonomous or voluntary (active) action performed by the second game element is performed based on information provided by an AI function included in the game server 2. This AI function is obtained by performing machine learning which uses, as training data, details of progress and results etc. of many battle games. Although a deep learning (deep machine learning), a reinforcement learning, or a combination thereof may be a typical machine learning, it is not limited thereto.

Further, the autonomous or voluntary (active) action performed by the second game element not only changes in accordance with performance of the AI function with which the game server 2 is equipped, but is affected by the character information of the second game element. For example, all the ability of the AI function with which the game server 2 is equipped cannot not be demonstrated in cases of some pieces of the character information of the second game element, so that only part of the ability of the AI function can be achieved. That is, it can be said that as if the ability of the AI function, with which the game server 2 is equipped, is sequentially released as the level of the character information of the second game element increases. An algorithm for finding an optimal solution may be used, whereby search time for the solution is increased as the character information level of the second game element increases, thereby finding a more optimal solution. In addition, two or more algorithms with different precision may be prepared, and a more precise algorithm thereamong may be used as the level of the character information of the second game element increases. It should be noted that the second game element is described below as a buddy.

[Outline of Game]

To help understanding of the present embodiment, an overview of a game will be described by using display screens shown on a display 11 of a player terminal 1.

In a game according to the present embodiment, players A and B use virtual game cards, which are game objects (first game elements, in each of which a character is embodied, and which is hereinafter simply referred to as "cards"), in a game. Two or more kinds of cards are prepared, and are distinguished from each other by combinations of an ability of a character associated with each card, an attribute, cost, rarity of the card and the like. As the ability of the character, for example, ability parameter values, such as a level, an attack power, and HP (hit point), etc., which are used in a match-up play (a battle), against a battle opponent, such as an enemy character controlled by a computer, or another player, etc., are predetermined.

A minimum number of cards required in the match-up play (battle) is given when an account is registered. Further, the cards can be acquired during a game. Furthermore, the cards can be acquired by purchasing them as charge items or by a lottery called Gacha. In addition, such a card can be acquired by obtaining a substantial game card (hereinafter referred to as a "real card") and completing a registration process to make the obtained real card usable in the game. Specifically, when the player A or B registers the real card, the player can acquire a card whose type is associated with the real card.

The player A then creates a deck by selecting a predetermined number of cards (for example, 40 cards) from among cards possessed by the player, and challenges to the match-up play (a battle) using the deck. In the match-up play (battle) using the deck, a win or loss of the battle against an opponent is determined by using an ability parameter value of a character defined in each of the cards forming the deck (deck cards) and a setting value of attribute, cost, rarity thereof etc.

When starting the game, the players A and B complete registration of their accounts. The player selects a favorite second game element (hereinafter referred to as a buddy) from among two or more second game elements which are presented by the player terminal 1 at the time when the players register their accounts so that the buddy forming a group together with each of the player A and B is set. There is a possibility that a play style of the game changes later on, depending on the character of the selected buddy. And the players A and B respectively organize their decks by selecting a predetermined number of cards (for example, 40 cards) from among cards respectively possessed by them. The deck can be organized from a deck organization menu, which is presented as a result of touching one on the card menu on a home screen or the like. The match-up play (battle) is started by an operation for selecting a battle menu from the home screen displayed after login.

Figure 3:
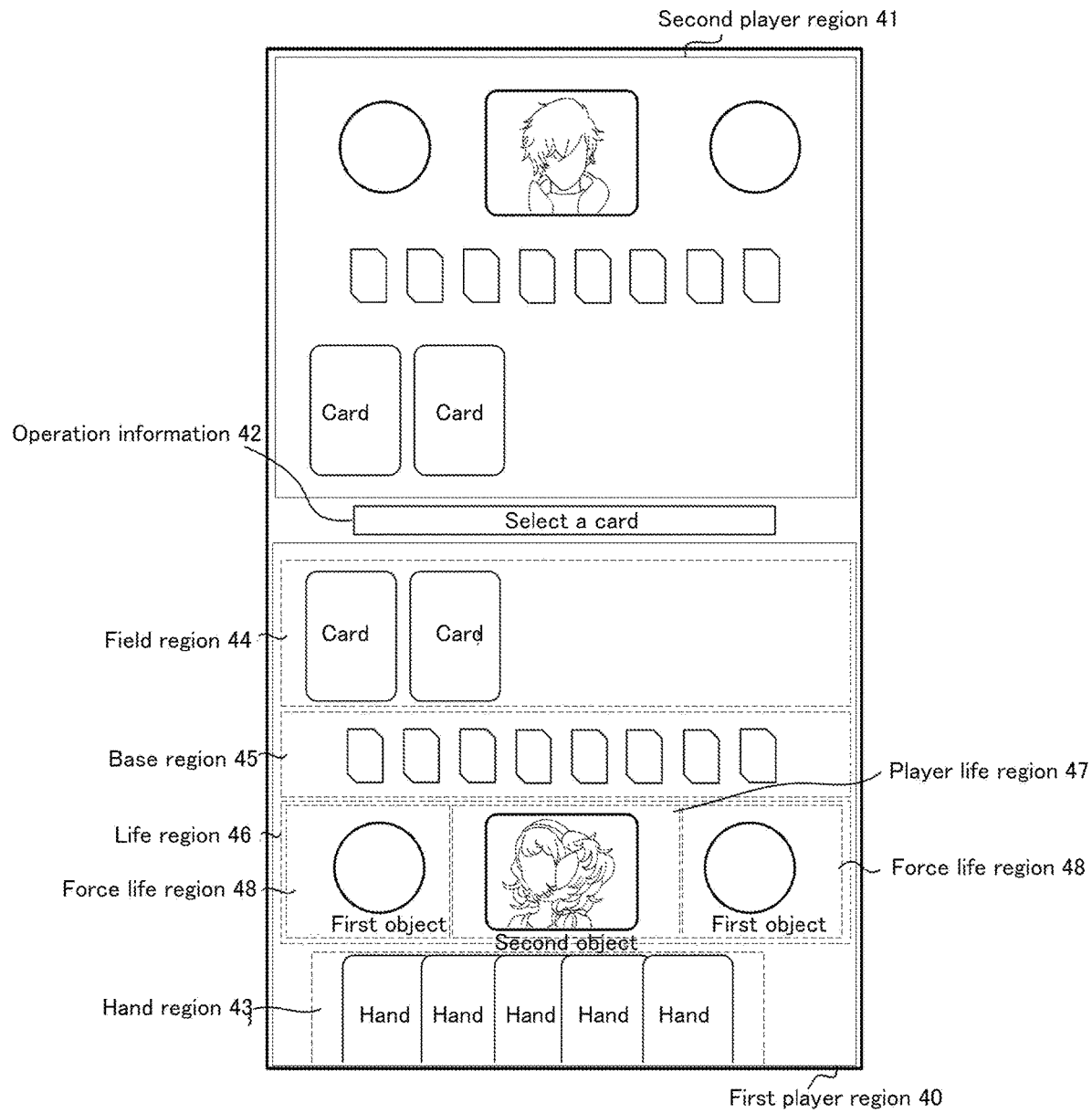
FIG. 3 is a diagram illustrating an example of a battle screen shown on a display 11 of the player terminal 1.

FIG. 3 is a diagram illustrating an example of a battle screen for a battle game displayed on the display 11 of the player terminal 1. The battle screen displayed on the display 11 includes a first player region 40 which is a region for the own player and a second player region 41 which is a region for an opposing player in the battle. Further, on a boundary between the first player region 40 and the second player region 41, operation information 42, which shows information of a currently available operation, is displayed.

Each of the first player region 40 and the second player region 41 includes a hand region 43, a field region 44, a base region 45 and a life region 46. On the hand regions 43, cards (hands) acquired from his or her own deck are arranged. Cards selected by the player from either the hand region 43 or the base region 45 are arranged in the field region 44. The cards in the hand region 43 can be placed in the field region 44 by consuming prescribed costs. The cards arranged in the field region 44 can invoke an action or an effect of the card. In each of the base regions 45, cards and mana items to be consumed as costs for arranging cards in the field region 44 are arranged. The life region 46 includes a player life region 47 which is a region for the player having a life (HP) and a force life region 48 which is a region for a first object (force) having a life. In the player life regions 47, a second object corresponding to the player and a value of the life possessed by the player are displayed. In the force life region 48, first objects and a value of the life possessed by each first object, are displayed. The first object demonstrates a specific effect in the game.

In the battle, a turn of the player A and that of the player B who is an opponent in the battle are alternatively performed. Each of these turns includes a plurality of phases composed of a standby phase, a mana phase (a card usage preparation phase), and a main phase (a battle phase) or the like.

The standby phase comprises a step in which cards drawn from the deck are placed in the hand region 43 or the like. In the mana phase, the player can place cards or mana items in the player's region 45.

In the main phase, the player can perform a summon of a character, attack against an opponent (attack), activation of a card effect, and movement of a card, etc. The summon of a character is performed by placing a card in the field region 44 under a condition that a payment is made as a cost therefor.

The attack against an opponent (attack) comprises a plurality of steps such as an attack designating step, a flash timing step, a block designation step, a battle settlement step and the like. In the attack designation step, the own player selects an attack target from the opponent and a force. In the flash timing step, the own player and the opponent player can respectively use a specific card having a special effect. In the block designation step, the opponent player can select whether or not to block the attach from the own player, by using a card placed in the field region 44 of the second player region 41. In the battle settlement step, the result of the attack is judged, and based on the judgement result, solution processing etc. is performed wherein the card on the attacking side and/or blocking side is vanished, and a life of the opponent player or that of the force etc. is reduced.

In the activation of a card effect, a special effect of a specific card (for example, a magic card) arranged in the hand region 43 is activated, conditional upon payment of compensation. In addition, regarding the movement of a card, the card is moved between the field region 44 and the base region 45. The player may terminate the battle phase without performing any one of: summon of a character, attack against an opponent (attack), activation of the card effect, movement of a card and the like.

A turn of the player A team, which comprises such a series of phases and that of the player B team, who is an opponent in the battle, are alternatively repeated, and a win or loss thereof is determined when the life of either of the players reaches zero or the number of cards of his or her deck reaches zero. The rank of the player, buddy's empirical value and character information etc. change in accordance with the battle result in the game. The information which changes in accordance with the battle result in the game (the buddy's empirical value, the character information of the buddy, elements and the rank of the player etc.) is called changing capacity information.

[Functional Configuration]

Figure 4:
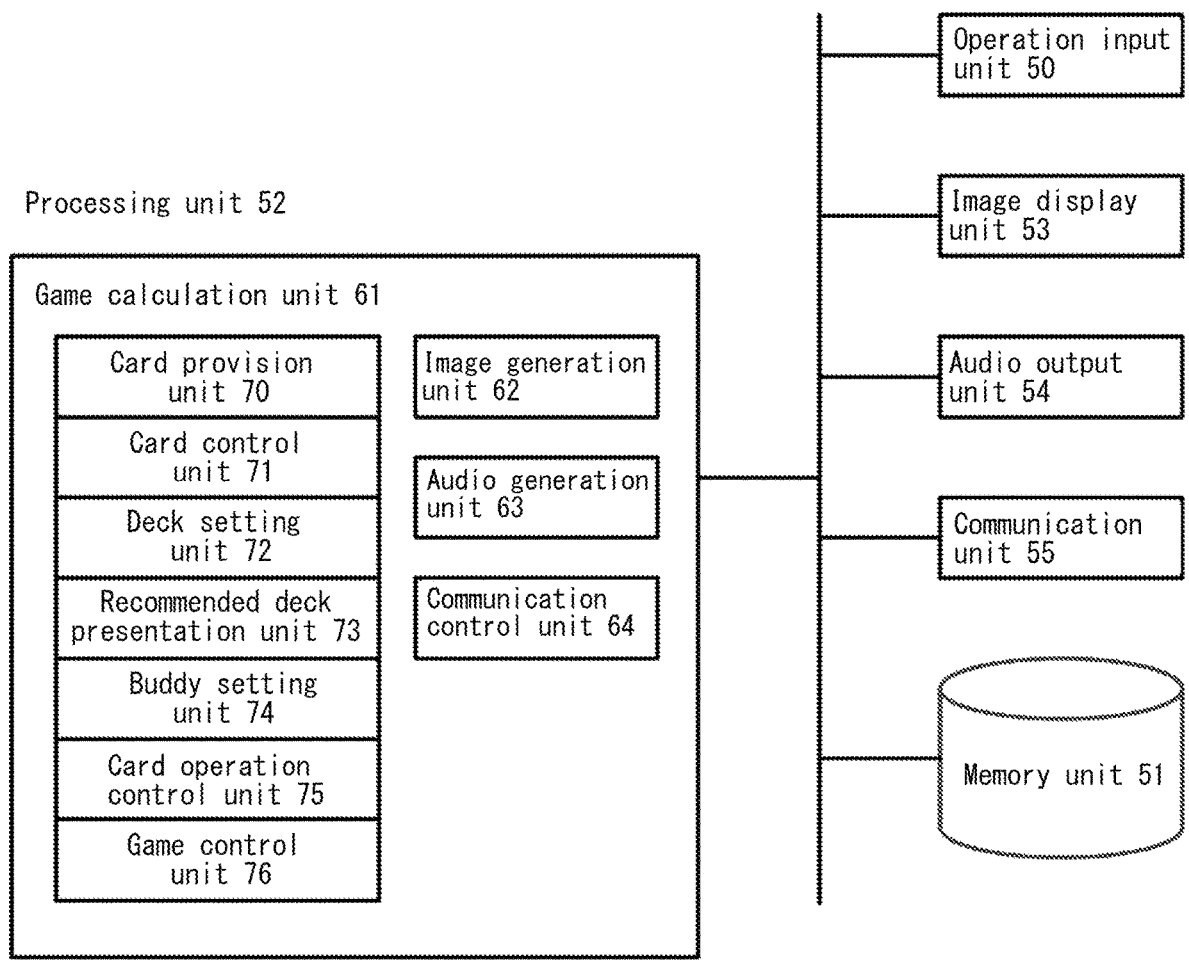
FIG. 4 is a block diagram illustrating an example of a functional configuration of the player terminal 1.

FIG. 4 is a block diagram illustrating a functional configuration of the player terminal 1.

As illustrated in FIG. 4, the player terminal 1 includes an operation input unit 50, a memory unit 51, and a processing unit 52, an image display unit 53, an audio output unit 54, and a communication unit 55.

The operation input unit 50 is provided to receive various operation inputs by a player, and outputs, to the processing unit 52, operation input signals which correspond to the various operation inputs. Functions of the operation input unit 50 can be achieved by an element directly manipulated by a finger of the player, such as a touch operation pad, a home button, a button switch, a joystick, a trackball, etc. Functions of the operation input unit 50 can also be achieved by an element, which detects motion and posture, such as an acceleration sensor, an angular velocity sensor, an inclination sensor, and a geomagnetic sensor, etc. The touch operation panel 12 shown in FIG. 2 corresponds to this element.

In the memory unit 51, programs for operating the player terminal 1 and for realizing various functions provided in the player terminal 1, and data etc. used during running of the programs are stored in advance, or such programs and data are temporarily stored every time each processing is performed. The memory unit 51 can be realized by, for example, an IC memory, such as a RAM, a ROM, a flash memory, etc., a magnetic disk such as a hard disk, etc., or an optical disc, such as a CD-ROM, a DVD, etc.

In the memory unit 51, a system program and a game program are stored. The system program realizes a basic function of the player terminal 1 as a computer. The game program causes the processing unit 52 to function as a game calculating unit 61. This program is distributed from the game server 2 or some other application distribution server or the like when an account of the player is registered.

Further, card setting data and user information data is stored in the memory unit 51. In addition, model data and texture data for displaying images of game elements, motion data, effect data, background images of game screens, sound data such as sound effects, etc. is accordingly distributed as data needed for the game and is stored in the memory unit 51.

The card setting data relates to character's abilities of the cards which the player possesses and attributions of the cards, and is prepared for each card. FIG. 5 is a diagram illustrating an example of the card setting data for a card which the player possesses. FIG. 5 shows card setting data for a card specified by the card identification information "001". The card setting data includes such card identification information, character name, a card image, ethnicon, ability, an attack power, hit point, rarity, cost information, attribute (color) etc. In addition, FIG. 5 shows an example of the card setting data, but it is not limited thereto. The amount of card setting data increases or decrease when the number of cards, which the players possess, increases or decreases.

The user information data is used in the progress of the game, and is various kinds of data related to the player. FIG. 6 is a diagram illustrating an example of the user information data. In the example shown in FIG. 6, the user information data includes player identification, rank, elements (accumulated points for wins up to the present time), buddy setting data, possessed card information, deck setting data, battle statistics data (date of battle, win or loss etc. for each battle of the player and the buddy), and balance information etc. The buddy setting data relates to the buddy selected by the player from among two or more types of buddies at the time of account registration, and includes data, such as buddy identification information, a character image, a buddy name, a buddy empirical value, character information (a level, a card comprehension level, personality, and a synchronization level) etc. The personality includes data of a color (attribute) and points (accumulated value) for each color which are associated with the buddy at the time. The possessed card information includes card identification information of the cards which the players possess. The deck setting data relates to each of decks which the players possess, and includes the card identification information of cards which form each deck. In addition, the user information data is not limited to the example shown in FIG. 6, and may have a data structure other than that.

The processing unit 52 integrally controls an operation of the player terminal 1 based on the programs and data stored in the memory unit 51 and the operation input signals from the operation input unit 50 or the like. Functions of the processing unit 52 can be achieved, for example, by a microprocessor, such as a CPU, a GPU, etc., and electronic components including an ASIC and an IC memory etc. The processing unit 52 includes, as main functional units, the game calculating unit 61, an image generation unit 62, and an audio generation unit 63 and a communication control unit 64.

The game calculating unit 61 performs various game processing for realizing the game according to the present embodiment and outputs a result of the processing to the image generation unit 62 and the audio generation unit 63. The game calculating unit 61 includes a card providing unit 70, a card management unit 71, a deck setting unit 72, a recommended deck presenting unit 73, a buddy setting unit 74, a card operation control unit 75 and the game management unit 76.

The card providing unit 70 performs processing related to provision of a card. A card is provided to the player when the player satisfies predetermined conditions. The above-described conditions include payment of a price (by money, in-game currency, and points which the player has earned by participating in a drawing event conducted on the internet or the like), exchange for compensation obtained based on an action taken by the player in a game or outside the game, registration of a user account and the like. The card providing unit 70 transmits a card provision request to the server 2 and receives card data transmitted from the game server 2 via the communication unit 55 when the card provision conditions are satisfied. The card providing unit 70 adds it to the card setting data in the memory unit 51.

The card management unit 71 manages the cards which the players possess.

Figure 7:
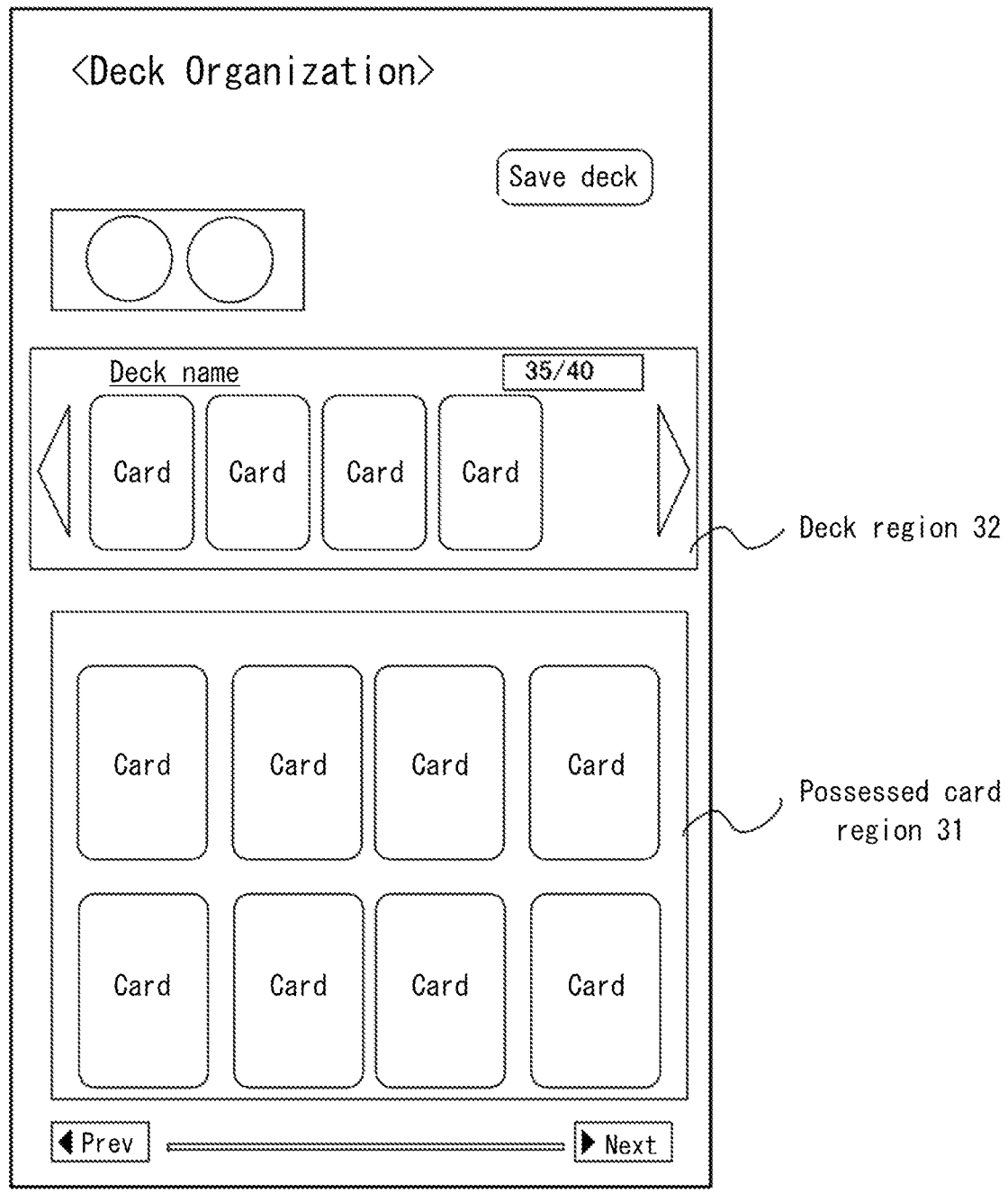
FIG. 7 is a diagram showing an example of a deck organization screen.

The deck setting unit 72 displays a deck organization screen, and performs processing for organizing a normal deck in accordance with an operation performed by the player. FIG. 7 is a diagram illustrating an example of the deck organization screen. The deck organization screen shown in FIG. 7 includes a possessed card region 31 showing cards the player possesses, and a deck region 32, which displays cards forming a deck. The player selects a card shown in the possessed card region 31, and perform a slide operation on the deck region 32 whereby the operated card is included in the deck. In addition, when a card in the deck region 32 is put on the outside of the deck region 32 by a slide operation, the operated card is removed from the deck. When a deck saving button is pressed on the deck organization screen, the deck setting unit 72 generates deck setting data, which includes card identification information of all the cards arranged in the deck region 32 and stores it in the memory unit 51. In this manner, the deck is organized.

Figure 8:
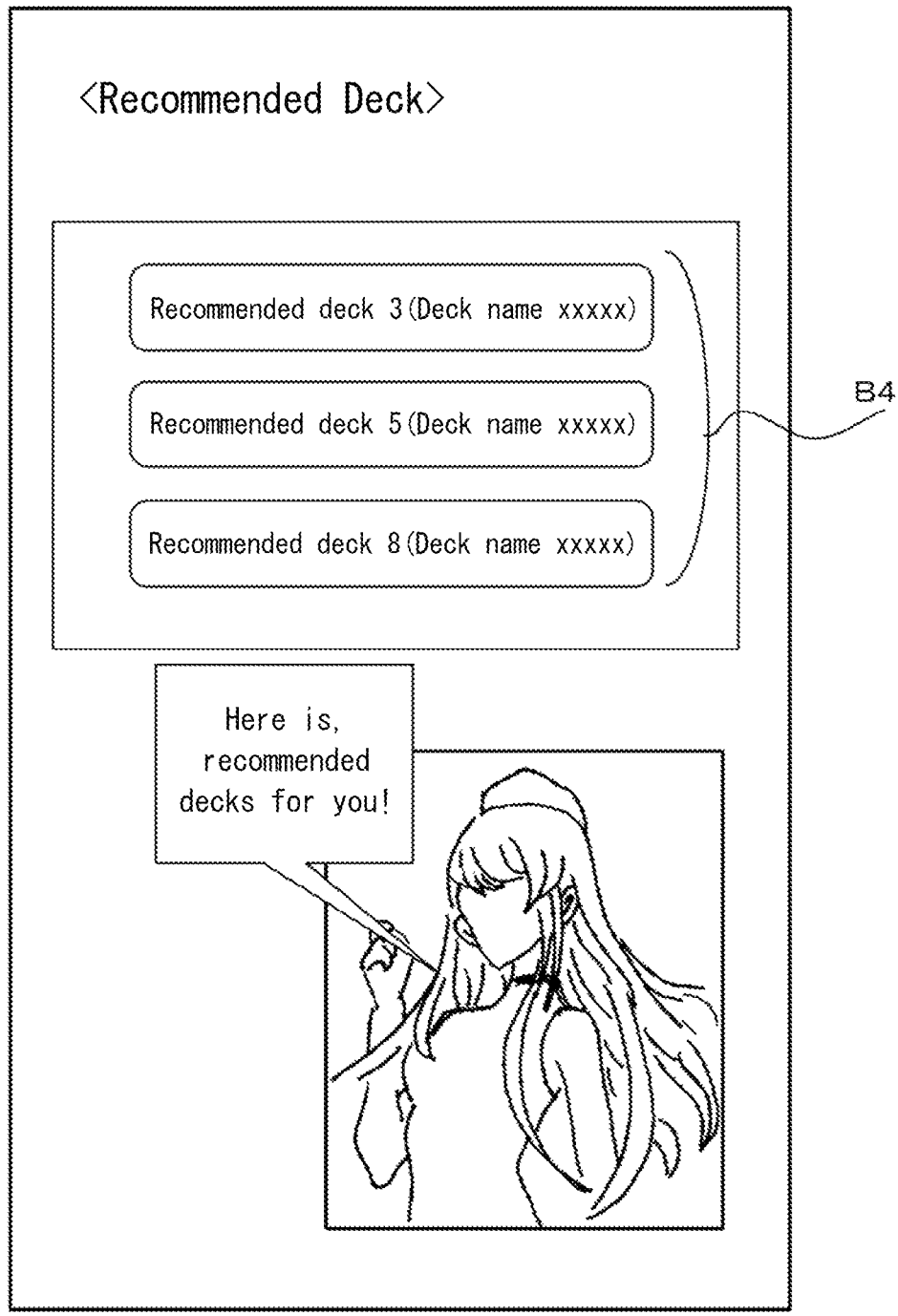
FIG. 8 is a diagram illustrating an example of a recommended deck presenting screen.

A recommended deck presenting unit 73 performs processing for presenting a recommended deck, provided that the number of predetermined losses of the player in battles reaches a prescribed number. In the processing for presenting such a recommended deck, the recommended deck presenting unit 73 counts the number of losses of the player in the battles, determines whether the number of the losses reaches the prescribed value. When the number of losses reaches the prescribed value, the recommended deck presenting unit 73 requests data for the recommended deck (recommended deck data) from the game server 2, and presents the recommended deck which is received from the game server 2. FIG. 8 shows an example of a screen for presenting a recommended deck (recommended deck presenting screen). A list of information such as respective deck names in the received recommended deck data etc. may be shown on the recommended deck presenting screen. In addition, as shown in FIG. 8, recommended deck buttons B4, which respectively correspond to the recommended decks, are shown thereon, and when the player selects and presses any one of the recommended deck buttons B4, images etc. of the cards included in the recommended deck may be displayed on the deck organization screen (FIG. 7). In addition, as shown in FIG. 8, a message that the recommended decks are presented may be displayed with an image of the buddy as if it is a comment from the buddy. The message may be output based on audio data of the buddy.

Methods for counting the number of player's losses performed by the recommended deck presenting unit 73 are set forth below.

(1) Counting a Cumulated Number of Player's Losses

When a win or loss result sent from the game server 2 after the win or loss is determined, indicates a "loss", the recommended deck presenting unit 73 adds 1 to a loss counter. And, when the counted number of losses reaches a prescribed value, the recommended deck presenting unit 73 requests the recommended deck data from the game server 2, and sets an initial value (0) to the loss counter.

(2) Counting the Number of Consecutive Losses of the Player

When the win or loss result sent from the game server 2 after the win or loss is determined, indicates a "loss", the recommended deck presenting unit 73 refers to a result of the previous battle, and adds 1 to the loss counter if the result of the previous battle is a "loss". And, when the counted number of losses reaches a prescribed value, the recommended deck presenting unit 73 requests the recommended deck data from the game server 2, and sets an initial value (0) to the loss counter. When the win or loss result sent from the game server 2 after the win or loss is determined, does not indicate a "loss" (indicating a "win"), the recommended deck presenting unit 73 sets an initial value (0) to the loss counter.

(3) Counting the Number of Losses of the Player within a Prescribed Period

When the win or loss result sent from the game server 2 after the win or loss is determined, indicates a "loss", the recommended deck presenting unit 73 adds 1 to the loss counter, and when the counted number of losses reaches a prescribed value, the recommended deck presenting unit 73 requests the recommended deck data from the game server 2, and sets an initial value (0) to the loss counter. In addition, the recommended deck presenting unit 73 sets the initial value (0) to the loss counter every prescribed period (for example, ever month).

The methods for counting the number of losses are not limited to the above (1) to (3), other methods may be used. In addition, the above-described counting methods (1) to (3) may be combined with each other. Further, the prescribed value is effective if the prescribed number is set to the extent that the player becomes conscious of an increase of the number of his or her losses. Although, for example, three or four is exemplified as the prescribed number, it is not limited thereto, and other number may be set. In addition, according to the present embodiment, the number of losses of the player is counted in the method (1) for "counting a cumulated number of player's losses."

The buddy setting unit 74 performs various setting processing regarding the buddy, such as setting of the buddy selected by the player from among two or more types of buddies The card operation control unit 75 determines a card selection or a card action in a battle based on a player's operation, displays an image in accordance with the determined card selection or card action, and performs processing for generating action and selection information. In addition, the card operation control unit 75 transmits the generated action and selection information to the game server 2 via the communication unit 55.

The game management unit 76 manages a progress of the entire game. For example, the game management unit 76 displays a menu screen etc., and performs the processing selected by the player. In addition, when a win or loss of the battle is determined, the game management unit 76 receives the result of the battle and various types of information which has changed due to the battle (changing capacity information) from the game server 2, and stores (updates) them in the memory unit 51. The changing capacity information includes a rank, elements, a buddy's empirical value, a level, a card comprehension level, a personality, a synchronization level and the like. The game management unit 76 may display the updated various types of information. For example, at least one of the rank of the player, the buddy's empirical value, the level of buddy, the card comprehension level, the personality and the synchronization level may be displayed on the screen.

The image generation unit 62 generates one game image screen per one frame time (for example, 1/60 second) based on a processing result of the game calculation unit 61, and outputs the generated image signal for the game screen to the image display unit 53. Functions of the image generation unit 62 can be realized by, for example, a processor, such as a GPU, digital signal processor (DSP) etc., a video signal IC, a program for video codec etc., an IC memory for drawing frames such as a frame buffer etc., and an IC memory which is used for texture data development and the like.

The audio generation unit 63 generates audio signals for sound effects and BGM based on the processing result of the game calculating unit 61 which are related to the game, audio information of operation assistance information, and various operation sounds or the like, and outputs these audio signals to the audio output unit 54. Functions of the audio control unit 63 can be realized by, for example, a processor such as a digital signal processor (DSP), an audio synthesis IC, etc., and an audio codec capable of reproducing an audio file and the like.

The communication control unit 64 performs communication connection and data processing for data communication with the game server 2.

The image display unit 53 displays various game screens based on an image signal(s), which is input from the image generation unit 62. For example, functions of the image display unit 53 can be realized by a display device, such as a flat panel display, a cathode ray tube (CRT), a projector, a head-mounted display, etc. In FIG. 2, the image display unit 53 corresponds to the display 11.

The audio output unit 54 outputs sounds, which are related to the game, such as audio, sound effects or the like, based on an audio signal inputted from the audio generation unit 63. In FIG. 2, the audio output unit 54 corresponds to the speaker 13.

The communication unit 55 achieves communication by connecting with the communication line N. Functions of the communication unit 55 can be realized by, for example, a wireless communication device, a modem, a TA (terminal adapter), a jack and a control circuit of a communication cable for wired communication, and the like.

Figure 9:
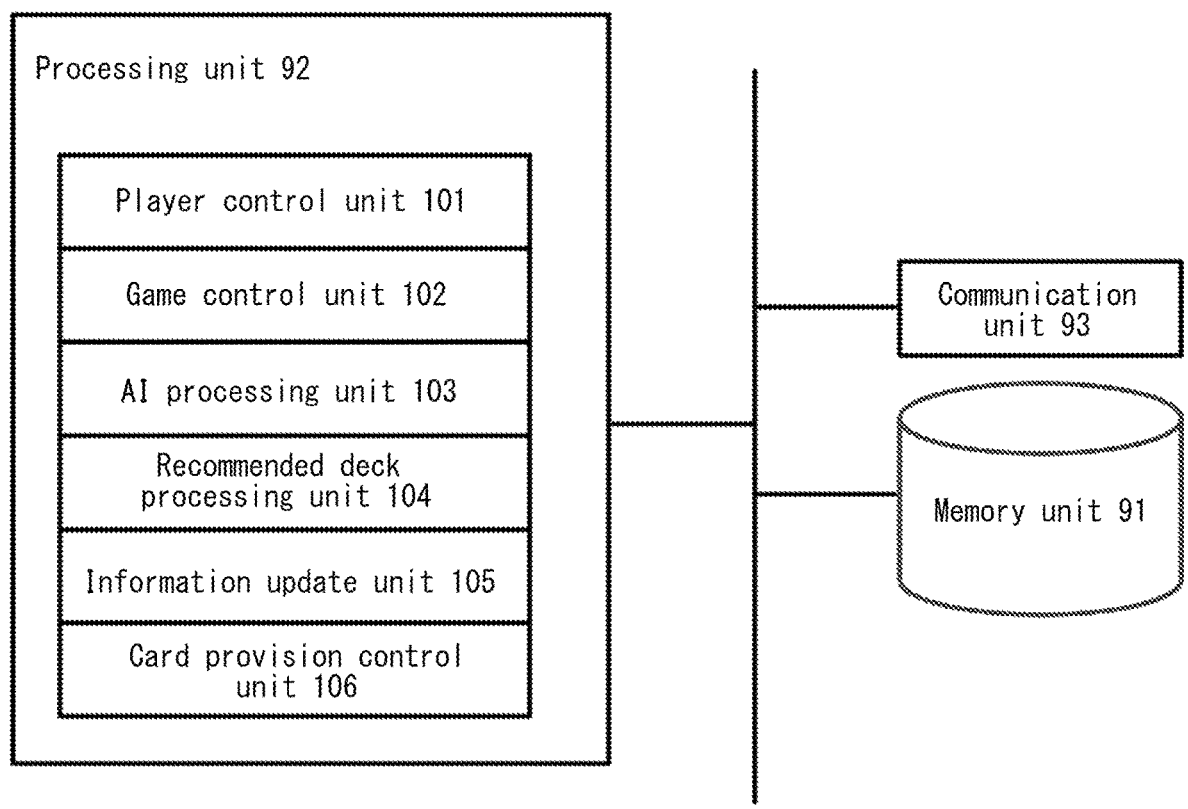
FIG. 9 is a diagram illustrating a functional configuration of a game server 2.

Next, the configuration of the game server 2 will be described. FIG. 9 is a block diagram illustrating an example of a functional configuration of the game server 2.

The game server 2 includes a memory unit 91, a processing unit 92, and a communication unit 93.

In the memory unit 91, a system program and a game program are stored. By the system program, basic functions of the game server 2, which serves as a computer, are realized. The game program causes the processing unit 92 to function as a player management unit 101, a game management unit 102, an AI processing unit 103, a recommended deck processing unit 104, an information updating unit 105, and a card provision management unit 106.

Further, in the memory unit 91, card data, recommended deck data, user information data, and battle data are stored.

The card data is data for all the cards used in the present game. Basically, data about all the cards used in the game, which is similar to the above-described card setting data shown in FIG. 5, is stored therein.

The recommended deck data represents formation elements of a recommended deck, which is obtained by the game server 2 based on information related to battle games played by two or more players (deck or card wining rates, usage rates, popularity stakes, usability etc.). FIG. 10 is a diagram illustrating an example of the recommended deck data. As shown in an example shown in FIG. 10, the recommended deck data for each recommended deck includes recommended deck identification information, a deck name, card identification information of cards forming the deck etc. All or part of data similar to the card data may be included, for each of the cards included in the recommended deck.

The user information data is basic data of players who take part in the game, and is stored for each player. The user information data stored in the memory unit 91, has a data structure similar to that of the user information data (refer to FIG. 6) which is managed by the player terminal 1.

The battle data relates to details and results of battles played by each player, and is stored for each player. The battles of the players include battles played by the players and battles played by the buddy. FIG. 11 is a diagram illustrating an example of the battle data. In the example shown in FIG. 11, the battle data is associated with user identification information of the player, and includes battle identification, battle results (wins or losses), battle dates, competitor (player or buddy), used deck information (card identification information of the deck used in the battle), detailed battle information and the like. The detailed battle information relates to details of the battle content and includes information such as card identification information of all the cards included in the deck used in the battle by the player or buddy, card identification information of a card used in each turn, and the result of the battle in each turn and the like. Here, the card used in each turn includes, for example, a card which is summoned in the field by paying a cost set in the card by the player. In addition, the content of the detailed battle information is not limited thereto, and may include various pieces of information regarding the battle.

The processing unit 92 includes the player management unit 101, the game management unit 102, the AI processing unit 103, the recommended deck processing unit 104, the information updating unit 105, and the card provision management unit 106.

The player management unit 101 manages the account and the progress etc. of the game by using the user information data, for each of connected player terminals 1.

The game management unit 102 receives the card setting information, which indicates the card arrangement state, and the action and selection information etc., from each player terminal 1; performs battle processing by using the card setting information, the action and selection information and the card data; and outputs the processing result. In addition, when the life or deck of either player becomes 0 so that the battle ends, the game management unit 102 transmits the battle result to the player terminal 1. Further, the game management unit 102 generates battle data; associates it with the user identification information of the player; and stores it in the memory unit 51.

The AI processing unit 103 has a learning model obtained by performing machine learning, which uses training data such as details of progress of many battle games and results thereof etc. Although deep learning (deep machine learning) is representative of a method of the machine learning, it is not limited thereto. The AI processing unit 103 receives an input of character information of the buddy for the player of the terminal 1 and the card setting information, which is transmitted from the player terminal 1; and outputs the card operation information of the buddy in the state of the card setting information. The output content of the learning model is different depending on the character information of the buddy. Processing is performed so that the higher the character information level (ability) is, the more appropriate solution is obtained (for example, the search time for the optimal solution is made longer or a learning model from which more appropriate solution can be obtained, is used and so on).

The recommended deck processing unit 104 obtains recommended deck data from the memory unit 91 upon a predetermined request from the player terminal 1, and sends the obtained recommended deck data to the player terminal 1.

The information updating unit 105 updates changing capacity information such as an empirical value of the buddy, a level, a card comprehension level, personality, a synchronization level, elements, a rank etc. in user information data of the player, by using battle data stored in the memory unit 91, and sends the updated information to the player terminal 1.

The information updating unit 105 adds a predetermined value to the element, or subtracts a predetermined value from the element in accordance with a win or loss result in battle data, in update processing of the element. In addition, in update processing of the rank, the rank is raised, dropped or maintained in accordance with the element after the change, since the rank is determined in conjunction with the element. In addition, in update processing of the buddy's empirical value, the information updating unit 105 adds a predetermined value to the buddy's empirical value in accordance with the battle result in the battle data. Further, in update processing of the level, the level is raised, lowered or maintained in accordance with the buddy's empirical value after the change since the level is determined in conjunction with the buddy's empirical value. The information updating unit 105 updates the personality in accordance with a use frequency of attribute of each of cards used in battles and the like, in update processing of the personality. Furthermore, the information updating unit 105 raises the card comprehension level at a predetermined rate, based on a use frequency of each of cards used in the battles. In addition, a value of the synchronization level is raised at a predetermined rate in accordance with a predetermined event (for example, the end of a battle etc.) regardless of a win or loss result or the information of the used cards.

The card provision management unit 106 reads the information of cards from the memory unit 91 in response to a card provision request from the player terminal 1 and transmits it to the player terminal 1. When the card provision management unit 106 receives a card purchase request from the player terminal 1, the card provision management unit 106 reads data corresponding to the card setting data from the memory unit 91 after a payment of consideration is confirmed, and sends it to the player terminal 1. Further, the card provision management unit 106 sends the information of the card obtained by the player to the player management unit 101. The payment of consideration may be made by, for example, reducing the consideration from the balance (in-game currency or point balance) in the user information data stored in the memory unit 91, or other payment methods may be used.

The communication unit 93 achieves communication by connecting to the communication line N.

[Operation of Each Device]

Figure 12:
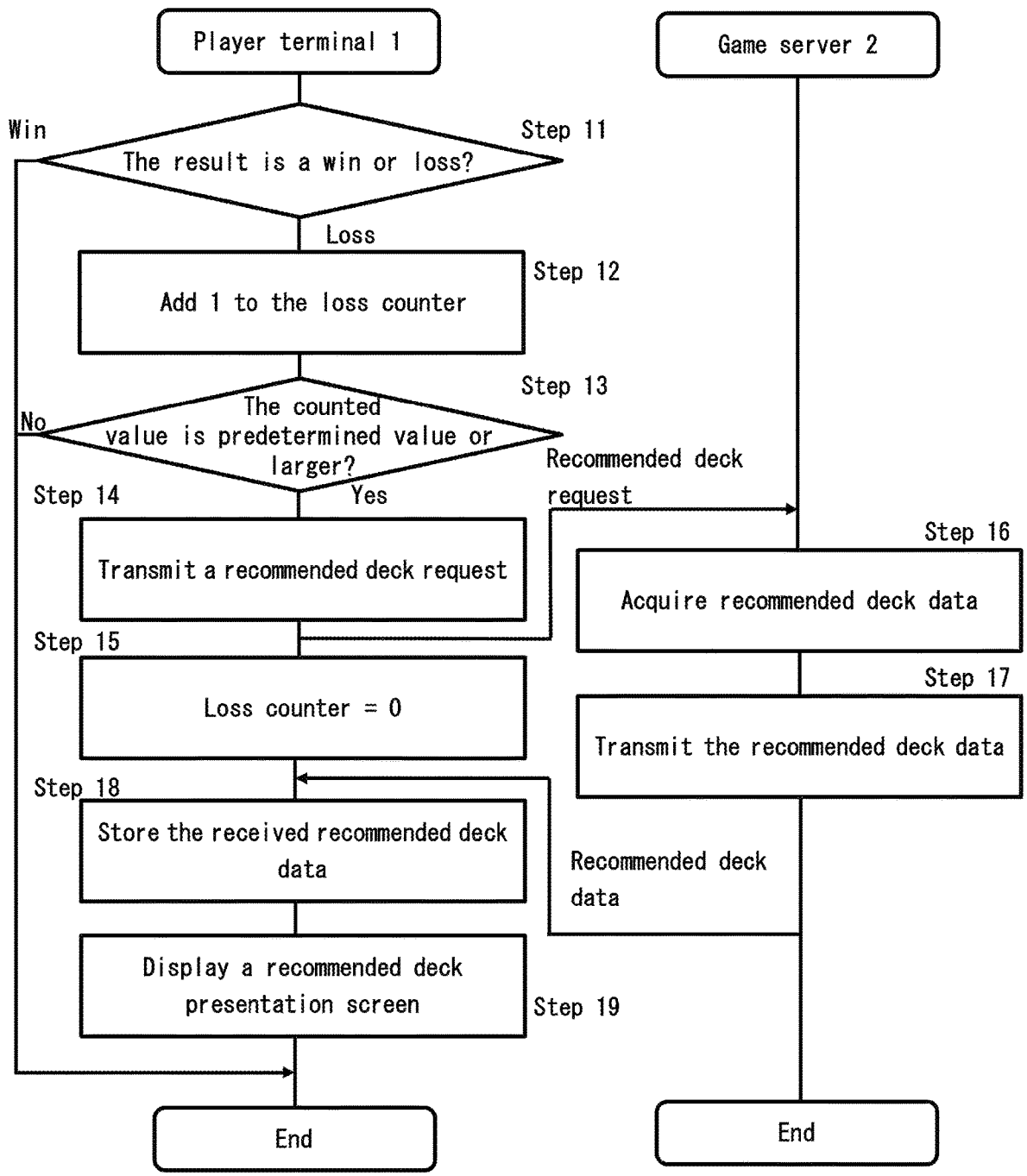
FIG. 12 is an overall sequence diagram illustrating operations performed by the player terminal 1 and the game server 2.

Next, an operation of each device will be explained. FIG. 12 is a diagram illustrating a sequence of the entire system regarding processing in which a recommended deck is presented to the player (recommended deck presentation processing). Description will be given regarding case where the player A and the player B log thereinto by using the respective player terminals 1 and play a battle, and a win or lose is determined when the life or the number of cards of either player becomes zero. In this case, the win or loss result is transmitted to each of the player terminals 1 from the game server 2.

The recommended deck presenting unit 73 of the player terminal 1 judges the received win or loss result. When the win or loss result is a loss (Step 11: yes), 1 is added to the loss counter (Step 12). The recommended deck presenting unit 73 determines whether the value of the loss counter reaches a predetermined value or larger (for example, 3 or more) (Step 13). If the value is the predetermined value or larger (Step 13: Yes), the recommended deck presenting unit 73 transmits a recommended deck request to the game server 2, and then the loss counter is set to an initial value (0) (Step 15).

The recommended deck processing unit 104 of the game server 2 acquires recommended deck data in response to the request from the player terminal 1 (Step 16). The recommended deck processing unit 104 transmits the acquired recommended deck data to the player terminal 1 (Step 17).

The recommended deck presenting unit 73 stores the received recommended deck data (Step 18), and displays information of the recommended deck data on the recommended deck presenting screen display (FIG. 8) (Step 19).

As described above, according to the present embodiment, when the number of losses of the player reaches a predetermined number, the recommended deck which is recommended for use in the battle game, is presented. In such a configuration, When the number of losses increases, the player receives a presentation of the recommended deck which is recommended for use in the battle so that it is possible to reevaluate his or her own deck, whereby the enjoyability of the game may be enhanced.

First Modified Example of the First Embodiment

Figure 13:
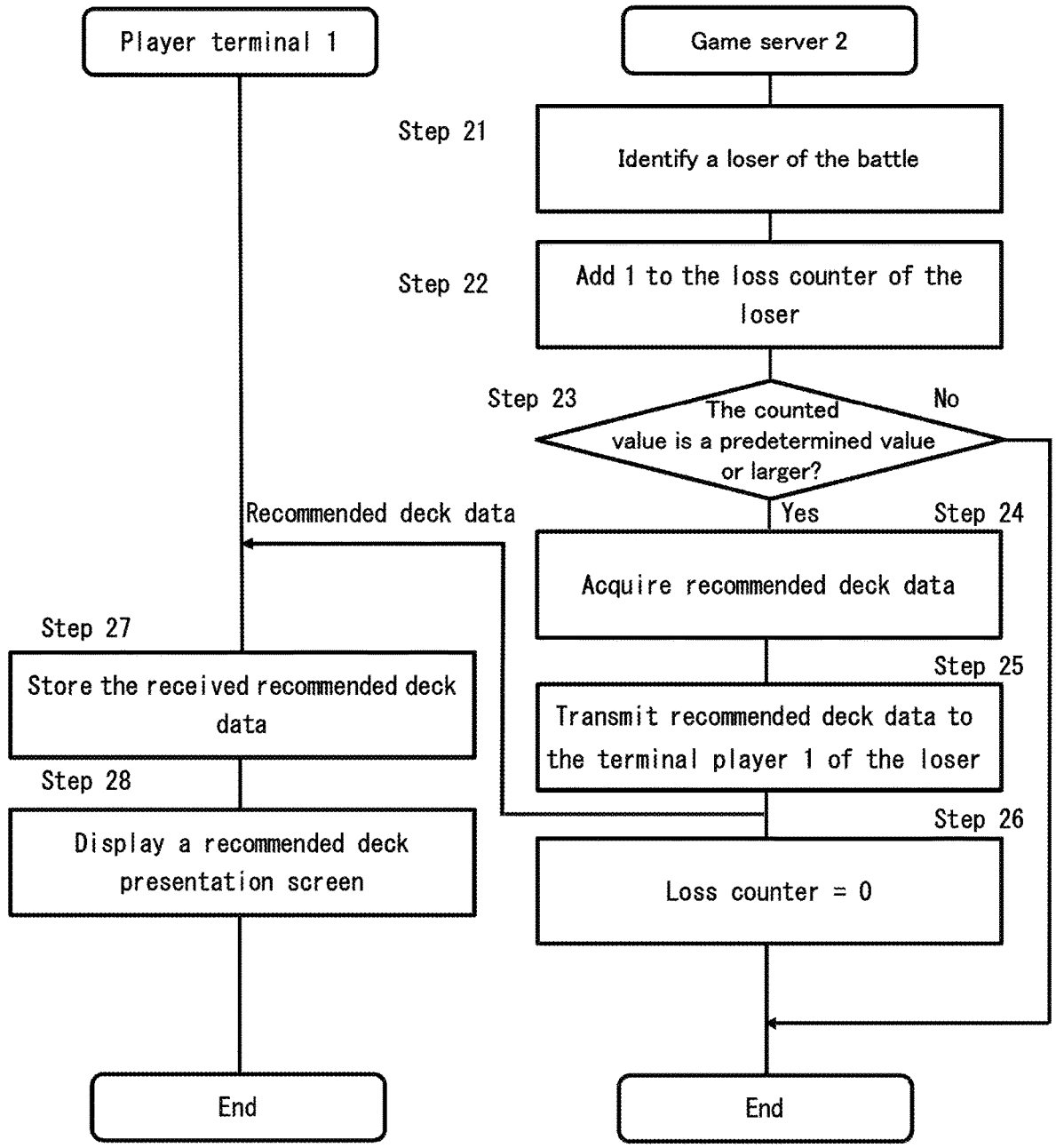
FIG. 13 is an overall sequence diagram illustrating operations of the player terminal 1 and the game server 2

Although the above-described embodiment, the counting of the number of losses is performed in the player terminal 1, it may be performed in the game server 2. A diagram of a sequence of the entire system with respect to recommended deck presentation processing in this case is shown in FIG. 13.

For example, when a win or loss of a battle between the player A and the player B, is determined, the recommended deck processing unit 104 of the game server 2 identifies a loser of the battle (Step 21). In this example, the loser is the player A. The recommended deck processing unit 104 adds 1 to the loss counter of the loser (player A) (Step 22). The recommended deck processing unit 104 determines whether the value of the loss counter of the loser (player A) is the predetermined value of larger (for example, 3 or more) (Step 23). If the value is the predetermined value of larger (Step 23: Yes), the recommended deck processing unit 104 acquires the recommended deck data (Step 24), and transmits the acquired recommended deck data to the player terminal 1 of the loser (player A) (Step 25). The recommended deck processing unit 104 sets the initial value (0) to the loss counter of the loser (player A) (Step 26). The recommended deck presenting unit 73 of the player terminal 1 of the loser (player A) stores the received recommended deck data (Step 27), and displays information of the recommended deck data on the screen (Step 28).

Second Modified Example of the First Embodiment

In the above-described embodiment, the recommended deck processing unit 104 acquires the recommended deck data from the memory unit 92, and transmits it to the player terminal 1. At this time, a recommended deck suited for the player may be selected and presented based on information regarding the player which is a requestor (for example, a possession state of player's cards, player's card usage trend in battles etc.). In the selection processing, for example, a deck which includes the player's possessing cards whose number is a predetermined number or more, may be selected. In this case, for each of the recommended deck data, the card identification information included in the recommended deck data and the card identification information included in the card possession information of the user setting data of the player are compared with each other whereby the recommended deck data in which the number of matched cards is a predetermined number or more, is selected. In addition, in the selection processing, for example, a deck similar to a deck which the player uses in the battle may be selected. In this case, for each recommended deck, the card identification information included in the recommended deck data and the card identification information included in the used deck information of the player in the battle data of the player are compared with each other, whereby the recommended deck in which the number of matched cards is a predetermined number or more, is selected. The information regarding the player used in the selection processing, includes, for example, a player's card possession state, the player's card usage trend in battles and the like. For example, the player's card possession state can be acquired from the possessed card information in the user information data and the like. The player's card usage trend in battles, can be acquired from, for example, used deck information in battles, detailed battle information etc.

Figure 14:
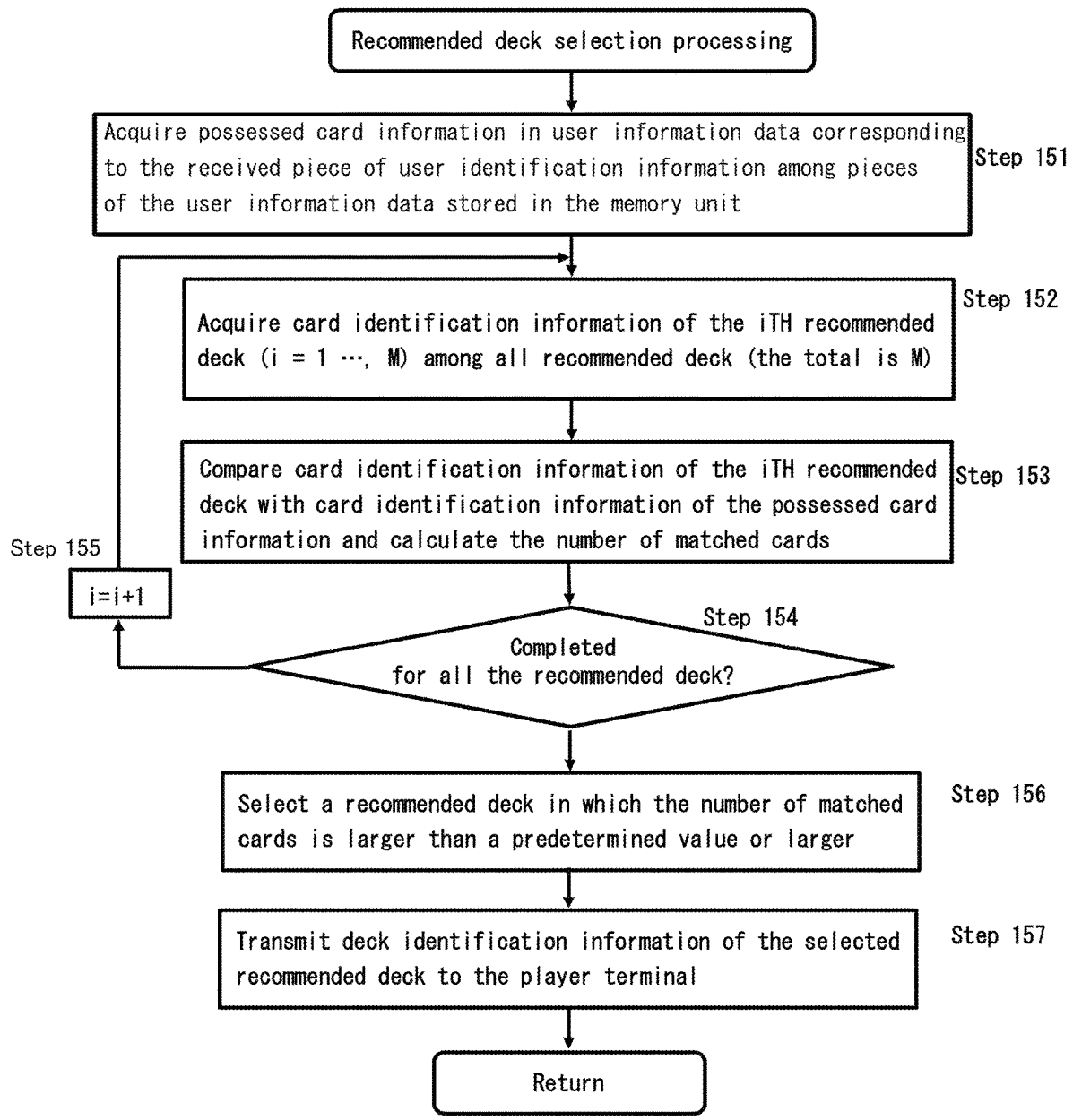
FIG. 14 is a flowchart illustrating a recommended deck selection processing.

As an example of the processing in which the recommended deck processing unit 104 selects the recommended deck (recommended deck selection processing), processing in which a deck including a predetermined number or more of player's possessed cards is selected from recommended decks stored in the memory unit 91, will be described, referring to FIG. 14. This processing corresponds to the processing of Step 16 shown in FIG. 12 and Step 24 shown in FIG. 13 (acquisition of recommended deck data).

The recommended deck processing unit 104 acquires possessed card information of the user information data corresponding to the user identification information of the player from among pieces of the user information data in the memory unit 91 (Step 151). The recommended deck processing unit 104 acquires card identification information included in the recommended deck data for the iTH recommended deck (i=, . . . , M) among the recommended deck data corresponding to a total of M recommended decks stored in the memory unit 91 (Step 152). The recommended deck processing unit 104 compares the card identification information of the iTH recommended deck which is acquired in Step 152 with the card identification information included in the possessed card information acquired in Step 151; counts the number of matched cards; and stores the counted value in a work area (Step 153). The recommended deck processing unit 104 determines if the processing with respect to all the recommended deck is completed (Step 154), and if not completed (Step 154: No), 1 is added to i (Step 155), and the processing returns to Step 152. In addition, if all the processing with respect to the recommended deck is completed (Step 154: Yes), then the counted value in the work area is referred to, and a recommended deck, in which the number of matched cards is a predetermined value or larger, is selected (Step 156). In this manner, the recommended deck suited for the player is selected from the recommended decks stored in the memory unit 91.

In addition, as another example, cards the player possesses are identified from among cards which are recommended in a battle, and a formation of a recommended deck may be determined so that these cards are included as much as possible.

Third Modified Example of the First Embodiment

Figure 15:
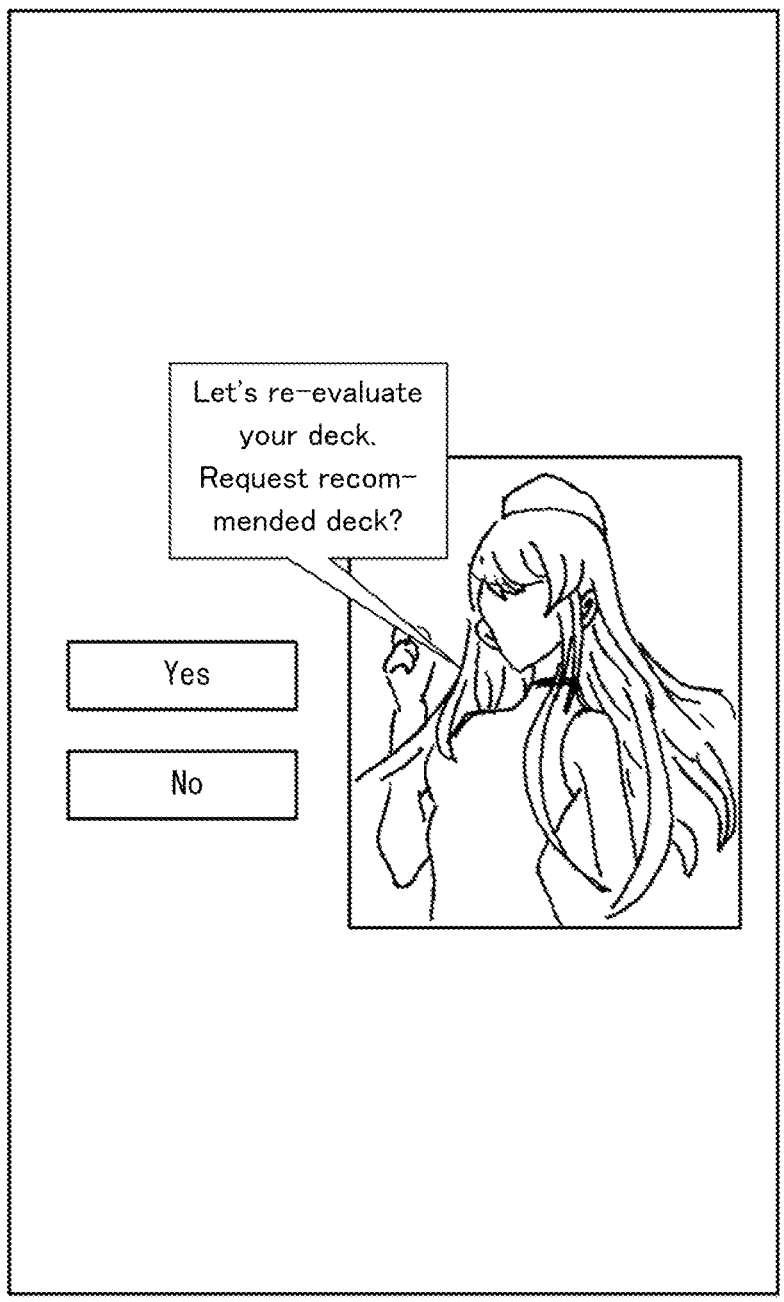
FIG. 15 is a diagram illustrating an authentication screen.

In the above-described embodiment, although the recommended deck presenting unit 73 presents such a recommended deck, under the condition that the number of losses in the battle games played by the player reaches a predetermined number, it may be additionally made the condition that the player performs an operation for approving the presented recommended deck. In this case, for example, when the value of the loss counter reaches a predetermined value or larger (for example, 3 or more), the recommended deck presenting unit 73 of the player terminal 1 displays an approval screen as shown in FIG. 15, and transmits a recommended deck request to the game server 2 when an approval operation about the presentation of the recommended deck is performed by the player (a "yes" button is pressed in the example shown in FIG. 15) Thus, it is possible to present a recommended deck, aligning with the player's intentions.

Second Embodiment According to the Present Invention

In the first embodiment according to the present invention, a recommended deck is presented when the number of losses in battles performed by the player reaches a predetermined value. However, there is a possibility that the presented recommended deck includes cards which the player does not possess. Therefore, in the second embodiment, when cards the player does not possess (unpossessed cards) are included in the cards forming the recommended deck, a card to be substituted for the unpossessed card (substitute card) will be presented.

Figure 16:
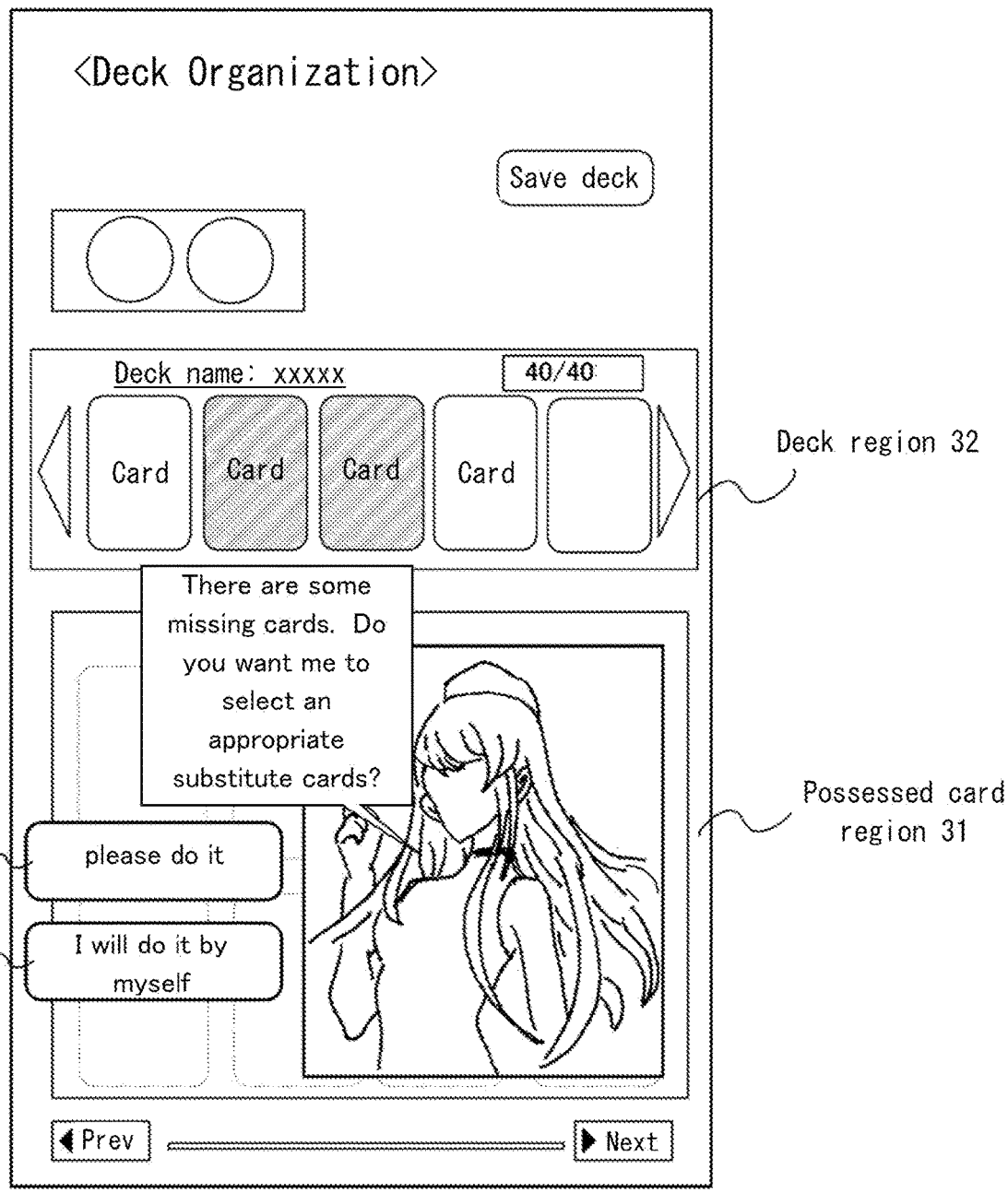
FIG. 16 is a diagram illustrating a display example in case where there is a card which is not possessed.

When the player selects one of the recommended decks on the recommended deck presenting screen (FIG. 8), the recommended deck setting unit 73 of the player terminal 1 according to the second embodiment acquires card identification information corresponding to the selected recommended deck from the recommended deck data stored in the memory unit 51. And, it acquires card images etc. corresponding to the acquired card identification information from the card setting data of the memory unit 51, and displays them on the deck region 32 of the deck organization screen. At this time, the recommended deck setting unit 73 compares the card identification information included in the recommended deck with card identification information of possessed card information in the user information data of the memory unit 51 (card identification information of the cards the player possesses), and displays cards which the player possesses among the cards of the recommended deck and the cards which the player does not possess (unpossessed cards) in expression forms different from each other, on the deck region 32. For example, as shown in FIG. 16, images of cards the player possesses may be displayed in color, and the unpossessed cards may be displayed in gray. A symbol showing that the cards are unpossessed cards may be shown on the images corresponding the cards. Further, when there are unpossessed cards in the cards which form the recommended deck, as shown in FIG. 16, the recommended deck setting unit 73 displays a message showing there are such unpossessed cards; a proposal request button B5 by which the player requests a proposal of a card(s) (substitute card(s)) to be substituted for the unpossessed card; and a button B6 by which the player organizes the deck, on the screen. In addition, as shown in FIG. 16, the message showing there are unpossessed cards may be displayed with an image of a buddy as if the message is a comment made by the buddy. The message may be outputted based on buddy's audio data.

When the proposal request button B5 is pressed, the recommended deck setting unit 73 requests the substitute card for the unpossessed card from the game server 2, and displays a substitute card proposal screen on which the substitute card for the unpossessed card is presented, by using the received information about the unpossessed card and the substitute card from the game server 2. An example of the substitute card proposal screen is shown in FIG. 17. The unpossessed card and the substitute card therefor are presented thereon. As shown in FIG. 17, as if the proposal for the substitute card is made from the buddy, the image of the buddy and the message may be outputted (displayed and/or audio is output). In addition, the proposal screen may include an adoption button which is pressed when the player adopts the proposal of the substitute card. When the adoption button is pressed, the recommended deck presenting unit 73 generates deck setting data including the card identification information of the substitute card instead of the card identification information of the unpossessed card, with respect to the recommended deck selected by the player, and stored it in the memory unit 51.

In the second embodiment, the recommended deck processing unit 104 of the game server 2 selects the substitute card for the unpossessed card in the recommended deck selected by the player, from among cards the player possesses, in response to a request from the player terminal 1. In this selection processing, a card, which has high similarity ratio to the unpossessed card in the recommended deck is obtained from among the cards the player possesses (possessed card information in the user information data). For example, correlation values between parameters of the card setting data regarding the unpossessed card and that of each of the cards the player possessed, are obtained, and the possessed card having the highest correlation value thereamong may be selected as the card having the high similarity ratio to the unpossessed card.

Figure 18:
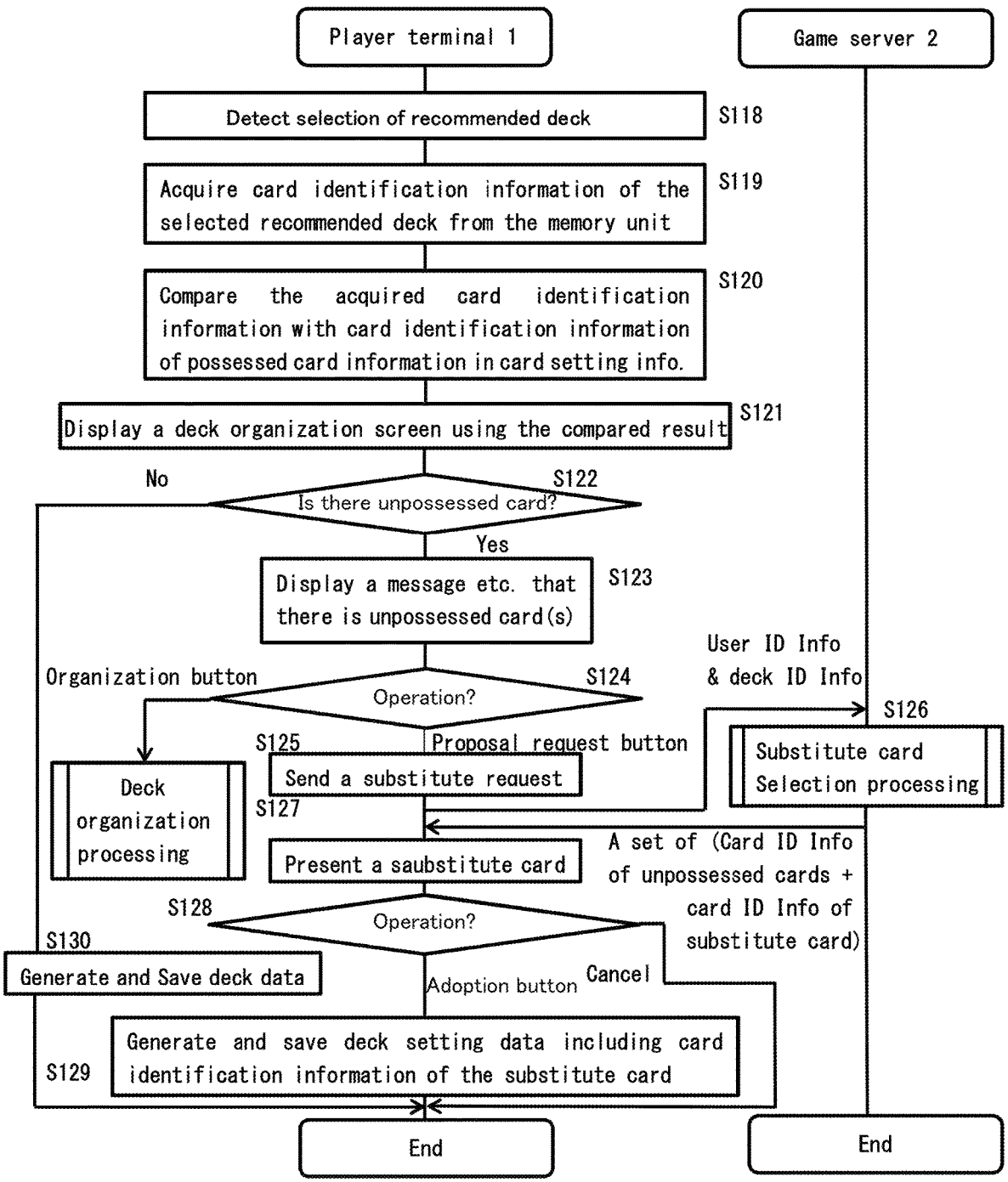
FIG. 18 is an overall sequence diagram illustrating operations of the player terminal 1 and the game server 2 according to the second embodiment.

FIG. 18 is a sequence diagram of the entire system including the player terminal 1 and the game server 2, with regards to processing (substitute card presentation processing) for presenting a substitute card in case where an unpossessed card(s) is included in the recommended deck selected by the player. The substitute card presentation processing shown in FIG. 18 is performed consecutively after the recommended deck presentation processing according to the first embodiment (Step 19 in FIG. 12 or Step 28 in FIG. 13)

When the recommended deck setting unit 73 of the player terminal 1 detects an operation (the recommended deck button B4 is pressed) in which the player selects a deck from the recommended decks presented on the recommended deck presenting screen (Step 118), the recommended deck setting unit 73 acquires card identification information included in the recommended deck data for the selected recommended deck from the memory unit 51 (Step 119). The recommended deck setting unit 73 compares each piece of the card identification information included in the recommended deck data with card identification information of the possessed card information in the user information data stored in the memory unit 51 (Step 120), and displays the deck organization screen, using a result of the comparison (Step 121). When there is a card(s) (unpossessed card) which is not matched with any piece of the card identification information of the possessed card data among pieces of the card identification information of the recommended deck data as the result of comparison in Step 120 (Step 122: Yes), for example, as shown in FIG. 12, the recommended deck setting unit 73 displays, on the screen, a message that there is the unpossessed card(s); a proposal request button B5 for requesting a proposal of a substitute card(s); and an organization button B6 by which the player organizes the deck by himself or herself (Step 123).

The player presses the proposal request button B5 (Step 124: Yes), the recommended deck setting unit 73 transmits the substitute card request with the user identification information of the player and the deck identification information of the recommended deck selected by the player (Step 125).

The recommended deck processing unit 104 performs substitute card selection processing for selecting a substitute card for the unpossessed card in the recommended deck in response to the request from the player terminal 1 (Step 126).

Figure 19:
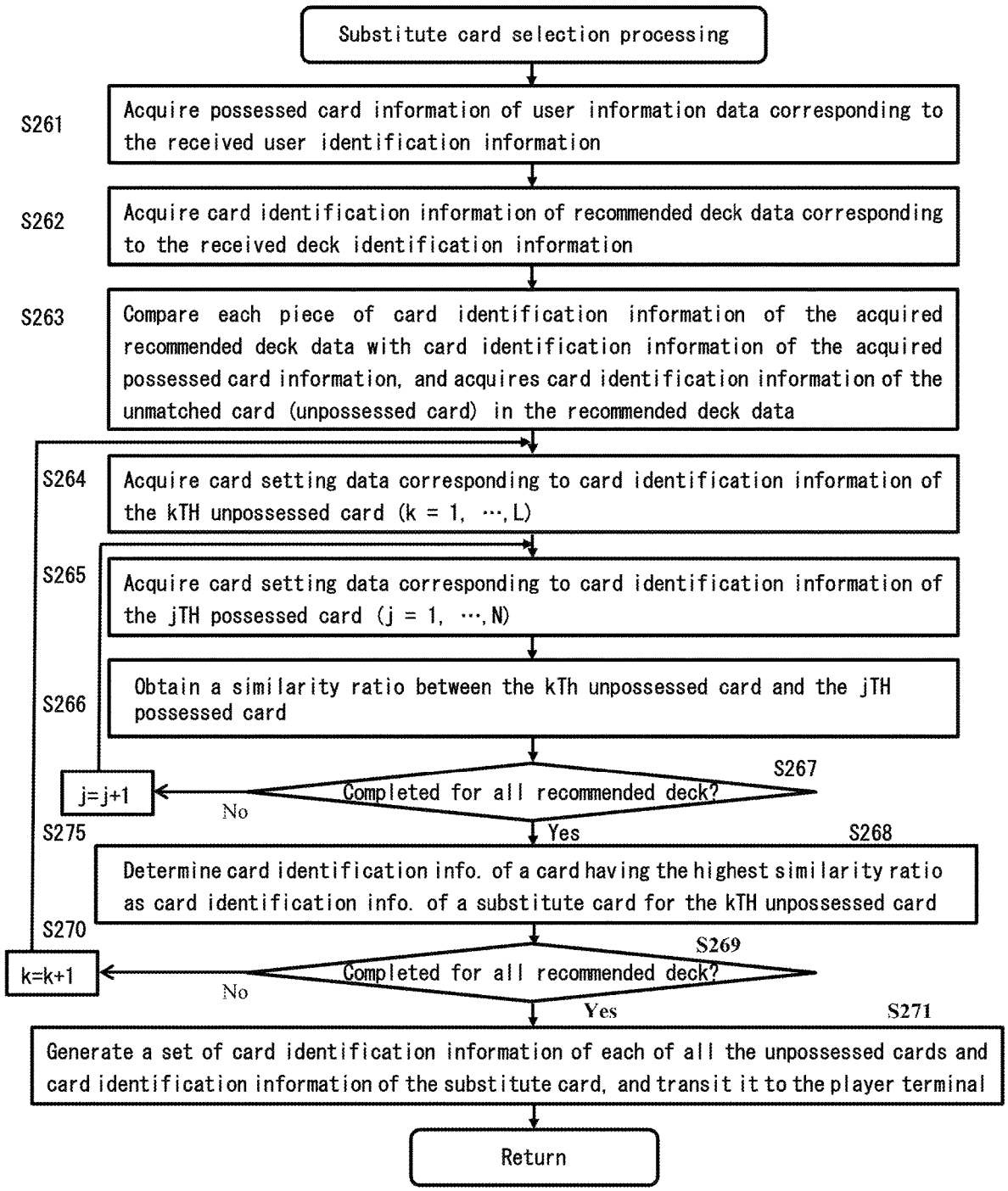
FIG. 19 is a flowchart illustrating a substitute card selection processing.

The substitute card selection processing performed by the game server 2 will be described referring to FIG. 19. The recommended deck processing unit 104 acquires the possessed card information of the user information data corresponding to the received user identification information from among the user information data stored in memory unit 91 (Step 261), and also acquires the card identification information corresponding to the received deck identification information from among the recommended deck data stored in the memory unit 91 (Step 262). And the recommended deck processing unit 104 compares each piece of the card identification information of the recommended deck data acquired in Step 262 with the card identification information of the possessed card information acquired in Step 261, and acquires the card identification information of the unpossessed card which is not matched in the comparison from among respective pieces of the card identification information acquired in Step 262 (Step 263).

From the memory unit 91, acquired is the card setting data corresponding to the card identification information of the kTH unpossessed card (k=1, . . . , L) from among pieces of the card identification information of the unpossessed cards (the total is L) acquired in Step 263 (Step 264). Also, the recommended deck processing unit 104 acquires, from the memory unit 91, the card setting data corresponding to the card identification information of the jTH possessed card (j=1, . . . , N) from among possessed cards (the total is N) indicated in the possessed card information, which is acquired in Step 261 (Step 265). The similarity ratio between the kTH unpossessed card and the jTH possessed card is calculated by using the card setting data acquired in Step 264 and that acquired in Step 265, and stored in the work region (Step 266).

In the calculation of the similarity ratio, for example, a correlation value may be calculated by using each parameter value of the card setting data of the unpossessed cards and each parameter value of the card setting data of the possessed cards, and regarded it as the similarity ratio. The Euclidean distance d between the card setting data of the unpossessed cards (parameter 1, parameter 2, . . . ) and the card setting data of the possessed cards (parameter 1, parameter 2, . . . ) is calculated and a card having the nearest (minimum) distance d may be regarded as a card having the highest similarity ratio. For example, the inverse of the distance d may be regarded as the similarity ratio, and a card having the highest similarity ratio may be selected.

The recommended deck processing unit 104 determines if the processing for all the possessed cards in the possessed card information is completed (Step 267), and if not completed (Step 267: No), 1 is added to j (Step 268), and the processing returns to Step 265. In addition, the processing for all the possessed cards is completed (Step 267: Yes), the recommended deck processing unit 104 selects a possessed card having the highest similarity ratio by referring to the similarity ratios in the work region; determines the card identification information as the card identification information of a substitute card for the kTH unpossessed card; and stores it in the work region (Step 268).

The recommended deck processing unit 104 determines if the processing for all the unpossessed cards acquired in Step 263 is completed (Step 269), and if not completed (Step 269: No), 1 is added to k (Step 270), and the processing returns to Step 264. In addition, when the processing for all the unpossessed cards is completed (step 269: Yes), the recommended deck processing unit 104 generates sets of the card identification information of each of all the unpossessed cards and the card identification information of the substitute card, and transmits them to the player terminal 1 (Step 271).

The description of the sequence is continued, referring to FIG. 18. The recommended deck setting unit 73 of the player terminal 1 acquires data such as an image etc. of each card from the card setting data in the memory unit 51 by using the received card identification information of the unpossessed card and the card identification information of the substitute card corresponding thereto, thereby generating and displaying, for example, a presentation screen in a format as shown in FIG. 16, in which the substitute card for the unpossessed card is presented.

When the player presses the adoption button arranged on the proposal screen (Step 128: Adoption button), with respect to the recommended deck selected in Step 118, the recommended deck setting unit 73 generates the deck setting data including the card identification information of the substitute card displayed on the proposal screen, instead of the card identification information of the unpossessed card and stores it in the memory unit 51 (Step 129).

When all pieces of the card identification information included in the recommended deck data are matched with the card identification information of the possessed card data as a result of comparison in Step 120 (where there is no unpossessed card) (Step 122: Yes), the recommended deck setting unit 73 generates the deck setting data including the card identification information of the recommended deck data, and stores it in the memory 51 (Step 130).

In addition, in Step 124, when the organization button B6 is pressed (Step 124: organization button), the recommended deck setting unit 73 displays a screen similar to the deck organization screen displayed in Step 121, and performs the deck organization processing for organizing the recommended deck in accordance with an operation of the player (Step 131).

Figure 20:
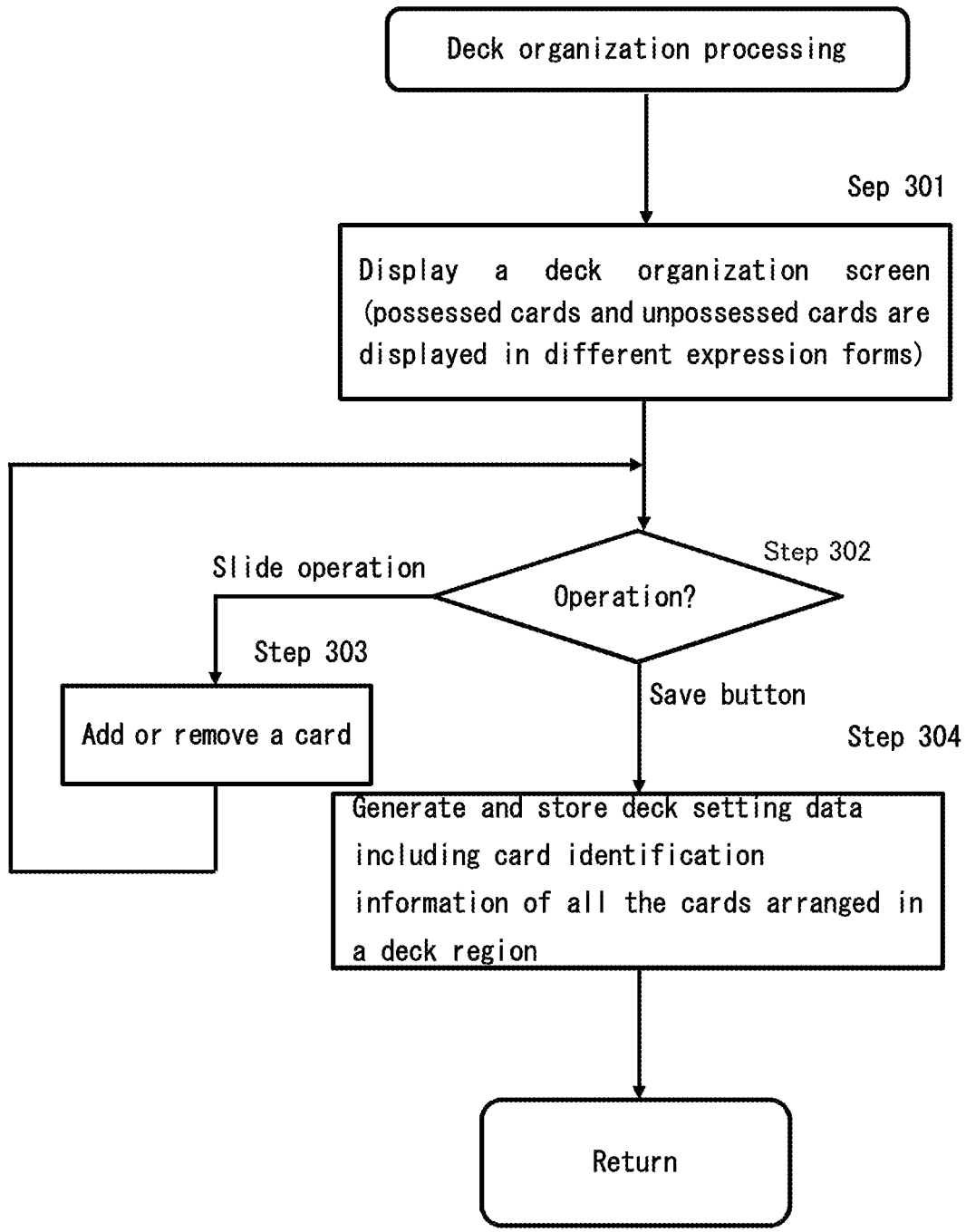
FIG. 20 is a flowchart illustrating a deck organization processing.

A description of the deck organization processing performed by the recommended deck setting unit 73 will be given referring to FIG. 20. The recommended deck setting unit 73 displays a screen similar to the deck organization screen displayed in Step 121 (Step 301). When the recommended deck setting unit 73 detects a slide operation to the card arranged in the possessed card region 31 or the deck region 32 on the deck organization screen (Step 302: slide operation), the recommended deck setting unit 73 performs processing for adding the operated card to the deck or taking it out from the deck (Step 303). When the save button is pressed on the deck organization screen (Step 302: Save button), the recommended deck setting unit 73 generates the deck setting data including the card identification information of all the cards arranged in the deck region 32 (Step 303).

In the second embodiment, in case where an unpossessed card is included in a recommended deck selected by the player from among recommended decks presented when the number of the losses played by the player reaches a predetermined number, a substitute card for the unpossessed card is presented. Such a configuration has an effect that even if a card(s) the player does not have are included in the recommended deck, the player can acquire the recommended deck by using the card, which is substitute for the unpossessed card.

Second Modified Example of the Second Embodiment

Figure 21:
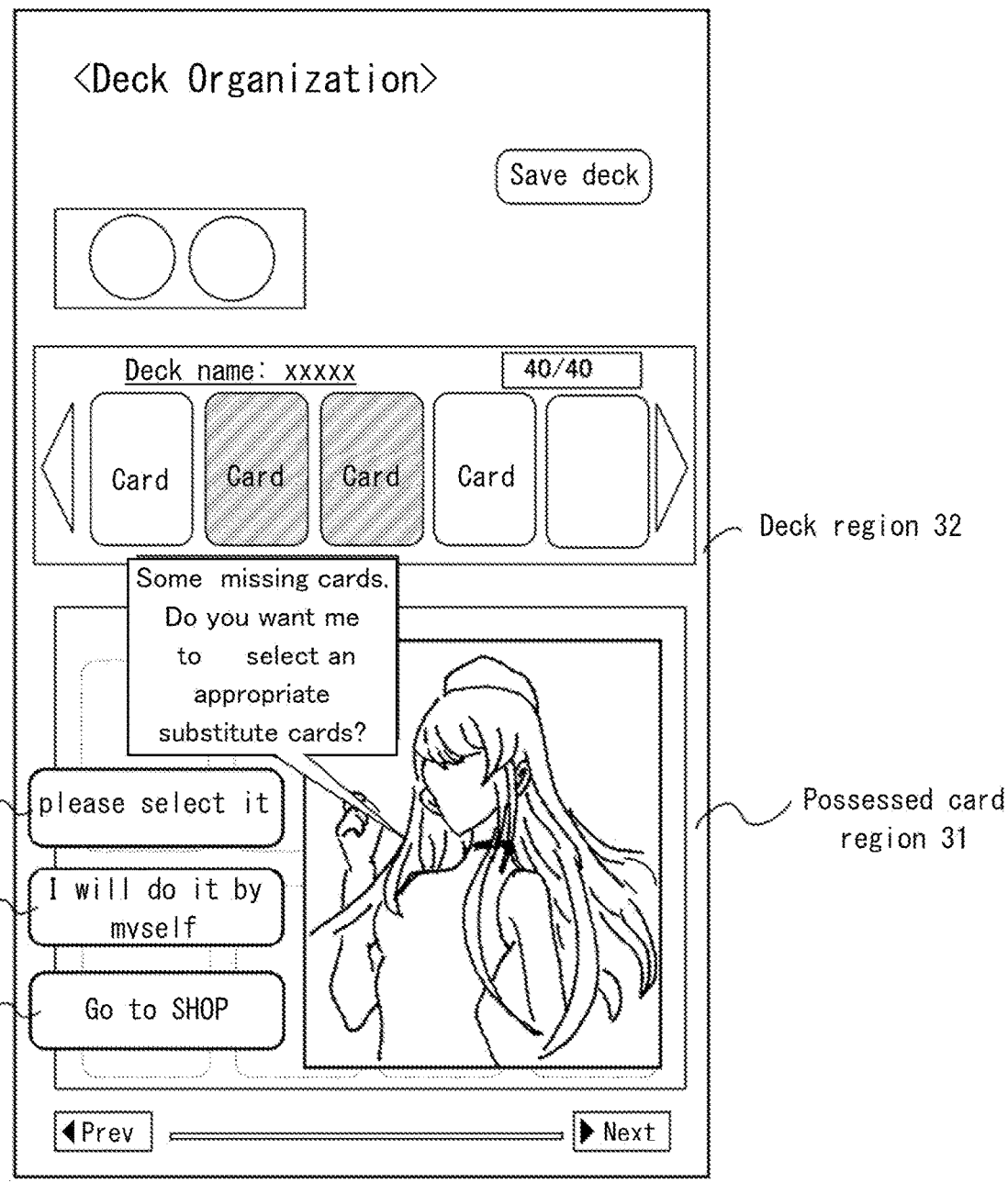
FIG. 21 is a diagram illustrating an example in case where there is an unpossessed card.

When the player selects a desired deck from the recommended deck presenting screen (FIG. 8), as shown in FIG. 21, for example, the recommended deck setting unit 73 may perform processing (provision guidance processing) for displaying a button B9 for transiting to a card provision screen (shop screen) which provides a card(s), in addition to a message etc. that there is an unpossessed card. When the button B9 is pressed, the card providing unit 70 displays a screen for presenting a card, and performs processing for presenting the card to the player conditional upon a payment of consideration. In addition, in case where a set of two or more cards (pack) may be presented on the card provision screen, such a pack of cards in which unpossessed cards are possibly included, may be presented as a provision subject.

In addition, a method of selecting a substitute card for a card the player does not have is not limited to the above-described processing. For example, a card which has a certain relation with the card the player does not have may be selected. For example, it may be possible to predetermine two or more card groups, each of which comprises two or more different cards; to identify a group to which the cards the player does not have belong; to search for cards the player possesses from among the other cards belonging to the group; and to select it as a substitute card. In this case, it is desirable that two or more cards which belong to the same group have similarity ratio which is a predetermined value or larger.

In a battle game in which the acquired recommended deck is used for the first time, control is performed so that the player who uses the recommended deck will win. In this case, the deck setting data of the user information data stored in the memory unit 51 of the player terminal 1 includes a recommended deck flag indicating whether it is a recommended deck, and a first battle flag indicating whether the player who uses the deck completes the first battle when it is the recommended deck. For example, the game management unit 76 of the player terminal 1 acquires the deck setting data the player uses before the start of the battle played by the player, and transmits it the game server 2. The game management unit 102 of the game server 2 refers to the recommended deck flag and the first battle flag in the received deck setting data, and adjusts the level of an opponent (buddy) of the player under the condition that the recommended deck flag indicates it is the recommended deck and that the first battle flag indicates the first battle is not completed. The adjustment of the level of the opponent (buddy) may be made by any method as far as the player wins, that is, for example, a predetermined level value (for example, a low value, such as 0 or 1 etc.), or a level value calculated by using the rank of the player (for example, a level value (X-10 etc.) obtained by subtracting 10 from a level X of the buddy whose rank is equivalent to the rank of the player) etc. may be set. After the battle is completed, the game management unit 76 of the player terminal 1 updates the first battle flag in the deck setting data so as to indicate that the first battle is completed.

In the above-described embodiments, the player terminal 1 receives the card setting data of the card provided to the player at a time the card is provided but it is not limited thereto. The player terminal 1 may receive the card setting data of all the cards (including cards which have not been presented to the player) used in the game, from the game server 2 in advance (at time the game program etc. is downloaded), and store it in the memory unit 51. In this case, when the cards are presented, the player terminal 1 receives the card identification information of the cards which are subjects presented from the game server 2, reads out, from the memory unit 51, the card setting data information corresponding to the received card identification information, and performs setting thereof.

A part or all of the above-described embodiments can be also described as in additional remarks set forth below. However, the present invention is not limited thereto.

[Additional Remark 1]

A terminal comprising an execution unit for performing a battle game in which a deck made up of two or more first game elements is used; and a recommended deck presenting unit for presenting a recommended deck which is recommended for use in the battle game under the condition that the number of predetermined losses of the player in the battle game reaches a predetermined number.

[Additional Remark 2]

A game management apparatus which controls a battle game using a deck made up of first game elements, comprising a memory in which execution instructions are stored; and a processor, wherein based on the execution instructions, the processor performs an acquisition processing for acquiring a recommended deck which is recommended for use in the battle game under the condition that the number of predetermined losses of the player in the battle game reaches a predetermined number and processing for outputting the recommended deck.

As described above, although the preferred embodiments are exemplified to explain the present invention, the present invention is not necessarily limited to the above-described embodiments, and can be modified and practiced in various manners within a technical idea of the present invention.

REFERENCE SIGNS LIST

1 Player terminal
2 Game server
11 Display
12 Touch operation panel
13 Speaker
31 Possessed card region
32 Deck region
40 First player region
41 Second player region
42 Operation information
43 Hand region
44 Field region
45 Base region
46 Life region 47 Player life region
48 Force life region
50 Operation input unit
51 Memory unit
52 Processing unit
53 Image display unit
54 Audio output unit
55 Communication unit
61 Game calculation unit
62 Image generation unit
63 Audio generation unit
64 Communication control unit
70 Card providing unit
71 Card management unit
72 Deck setting unit
73 Recommended deck setting unit
74 Buddy setting unit
75 Card operation control unit
76 Game management unit
91 Memory unit
92 Processing unit
93 Communication unit
101 Player management unit
102 Game management unit
103 AI processing unit
104 Recommended deck processing unit
105 Information updating unit
106 Card provision management unit

The invention claimed is:

1. A non-transitory computer readable medium storing a program causing a computer to perform execution processing for
performing a battle game in which a deck formed by a plurality of first game elements is used;
counting a number of losses of a player in the battle game;
determining whether the number of the losses reaches a predetermined number, and
performing a recommended deck presentation processing for presenting a recommended deck which is recommended for use in the battle game, when the counted number of losses of the player in the battle game reaches the predetermined number.

2. The non-transitory computer readable medium according to claim 1, wherein the number of losses is a cumulative number of losses of the player.

3. The non-transitory computer readable medium according to claim 1, wherein the number of losses is a number of consecutive losses of the player.

4. The non-transitory computer readable medium according to claim 1, wherein the number of losses is a number of losses in a prescribed period of time.

5. The non-transitory computer readable medium according to claim 1, wherein the presented recommended deck includes a first game element possessed by the player.

6. The non-transitory computer readable medium according to claim 1, wherein the program causes the computer to perform second game element setting processing for setting a second game element which is not included in the deck, wherein in the recommended deck presentation processing, the recommended deck is presented in a manner where the recommended deck is proposed by the second game element.

7. The non-transitory computer readable medium according to claim 1, wherein in the recommended deck presentation processing, the recommended deck is presented, conditional upon an approval operation by the player with respect to a presentation of the recommended deck.

8. The non-transitory computer readable medium program according to claim 1, wherein the program causes the computer to perform a substitute card presentation processing in which a first game element which is substitute for a first game element the player does not possess is presented to the player, when the first game element the player does not possess is included in the presented recommended deck.

9. The non-transitory computer readable medium according to claim 8, wherein in the substitute card presenting processing, a substitute first game element, which is selected from among the first game elements the player possesses, is presented.

10. The non-transitory computer readable medium according to claim 9, wherein the substitute first game element is a first game element having a similarity relation in a parameter with the first game element the player does not possess, among the first game elements the player possesses.

11. The non-transitory computer readable medium according to claim 8, wherein the program causes the computer to perform a provision guidance processing for outputting a display for guiding to a provision screen capable of providing the first game element the player does not possess when the presented recommended deck includes the first game element the player does not possess.

12. The non-transitory computer readable medium according to claim 1, wherein in the recommended deck presentation processing, the first game element the player possesses and the first game elements the player does not possess are displayed in different forms.

13. A non-transitory computer readable medium storing a program for controlling a battle game in which a deck formed by first game elements is used, wherein the program causes a computer to perform acquisition processing for acquiring a recommended deck which is recommended for use in a battle game under a condition that a number of losses of a player in the battle game reaches a predetermined number; and processing for outputting the recommended deck.

14. The non-transitory computer readable medium according to claim 13, wherein the program causes the computer to perform a control so that the player who uses the recommended deck wins in a first battle game in which the recommended deck is used.

15. A system comprising:
a game processing unit configured to perform a battle game in which a deck comprising a plurality of first game elements is used;
a counting unit configured to count losses of a player in the battle game;
a determining unit configured to determine whether the counted number of losses of the player reaches a predetermined number; and
a recommended deck presentation unit, configured to present a recommended deck recommended for use in the battle game when the determining unit determines that the counted number of losses of the player in the battle game reaches the predetermined number.

16. A terminal comprising:
game processing unit configured to perform a battle game in which a deck comprising a plurality of first game elements is used;
a counting unit configured to count losses of the player in the battle game;
a determining unit configured to determine whether the number of the losses reaches a predetermined number; and a recommended deck presentation unit configured to request, to a server, a recommended deck which is recommended for use in the battle game, receive the recommended deck from the server, present the recommended deck when the determining unit determines that the counted number of losses of the player in the battle game counted by the counting unit reaches the predetermined number.

* * * * *